United States Patent
Nitta

(10) Patent No.: US 8,970,919 B2
(45) Date of Patent: Mar. 3, 2015

(54) DISPLAY/INPUT DEVICE AND IMAGE FORMING APPARATUS INCLUDING DISPLAY/INPUT DEVICE

(71) Applicant: KYOCERA Document Solutions Inc., Osaka (JP)

(72) Inventor: Ryuichi Nitta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/868,833

(22) Filed: Apr. 23, 2013

(65) Prior Publication Data

US 2013/0286446 A1    Oct. 31, 2013

(30) Foreign Application Priority Data

Apr. 25, 2012 (JP) ................................ 2012-100082

(51) Int. Cl.
| | |
|---|---|
| H04N 1/04 | (2006.01) |
| H04N 1/32 | (2006.01) |
| G06F 3/12 | (2006.01) |
| G06F 17/00 | (2006.01) |
| G06F 3/048 | (2013.01) |
| G06F 3/041 | (2006.01) |
| G06F 3/0488 | (2013.01) |
| G03G 15/00 | (2006.01) |

(52) U.S. Cl.
CPC ............ *G06F 3/0488* (2013.01); *G03G 15/502* (2013.01)
USPC ......... 358/474; 358/442; 358/1.15; 358/1.13; 715/230; 715/765; 345/173

(58) Field of Classification Search
USPC ........ 358/474, 442, 1.15, 1.13; 715/230, 765; 345/173
See application file for complete search history.

(56) References Cited

U.S. PATENT DOCUMENTS

| | | | |
|---|---|---|---|
| 2006/0015811 A1* | 1/2006 | Tanaka et al. | 715/531 |
| 2011/0069356 A1 | 3/2011 | Yoshida | |
| 2011/0235109 A1 | 9/2011 | Yamaguchi | |
| 2012/0324399 A1 | 12/2012 | Katsumata | |
| 2013/0265252 A1* | 10/2013 | Sekiguchi et al. | 345/173 |

FOREIGN PATENT DOCUMENTS

| | | |
|---|---|---|
| JP | 2011-114515 A | 6/2011 |
| WO | 2011/108743 A1 | 9/2011 |

OTHER PUBLICATIONS

The extended European search report issued on Oct. 18, 2013, which corresponds to EP13164057.5 and is related to U.S. Appl. No. 13/868,833.

* cited by examiner

*Primary Examiner* — Charlotte M Baker
*Assistant Examiner* — Rury Grisham
(74) *Attorney, Agent, or Firm* — Studebaker & Brackett PC

(57) ABSTRACT

A display/input device includes a storage section, a display section, a touch panel, a control section, and a recognition section. The storage section is configured to store destination data indicating address information. The display section is configured to display a screen. The touch panel is configured to detect user's touched point. The control section is configured to allow the display section to display a list for specifying a destination name on the basis of the destination data. The recognition section is configured to recognize a moving direction in which the touched point moves. When the recognition section recognizes the moving direction of the touched point, the control section allows the display section to display the list in plural pages in the moving direction.

13 Claims, 13 Drawing Sheets

DISPLAY/INPUT DEVICE AND IMAGE FORMING APPARATUS INCLUDING DISPLAY/INPUT DEVICE

INCORPORATION BY REFERENCE

The present application claims priority under 35 U.S.C. §119 to Japanese Patent Application No. 2012-100082, filed Apr. 25, 2012. The contents of this application are incorporated herein by reference in their entirety.

BACKGROUND

The present disclosure relates to a display/input device including a display section and a touch panel and an image forming apparatus including such a display/input device.

Electronic hardware capable of transmitting data may have a function called an address book so that the address or number of a destination can be set by only selecting one of destinations displayed as candidates. For example, the names of the destinations and their corresponding addresses, numbers and/or groups are input in advance in the electronic hardware. A storage section (e.g., an embedded memory) of the electronic hardware stores the names of the destinations and a variety of information corresponding to the names of the destinations. The user specifies a destination to which data is to transmit among displayed destinations to call up the stored address or number of the specified destination.

For example, some hardware (a mobile terminal) includes a display section, a control section, a touch panel, and a storage section. The storage section stores telephone book data. The control section executes first processing that allows a first display region in a display screen to display tubs, in which the initial Hiragana characters of the respective rows in the Japanese syllabary are displayed. Then, the control section executes second processing that allows the display screen to display, when it is detected that touch to an area corresponding to any one of the tubs continues over a predetermined time period, a pull-down tub that displays the character displayed in the tub and the subsequent characters belonging to the row of the character. Further, when it is detected that the touched point moves from the tub to the pull-down tub, and then, an area of any of the characters displayed in the pull-down tub is touched up, the control section executes third processing to read out data, which bears the characters at the touch-up area and characters following the touched-up character as initial characters, from the telephone book and to allow the display screen to display the data. With this configuration, operation relating to search for the telephone book can be easily and suitably performed with the advantages of the touch panel gained.

For example, image forming apparatuses, such as copiers, multifunction peripherals, printers, facsimile machines, etc. are also provided with an operation panel including a combination of a panel for display and a touch panel. Further, an operation panel fixed to an image forming apparatus may also store in advance plural pieces of address information, each piece of which is a combination of a destination name and destination information indicating the number and address corresponding to the destination name.

The operation panel of the image forming apparatus may display plural pieces of address information in a listed fashion (address book function). After the user searches a destination to which data is to transmit and allows to it to be displayed, the user touches a display area of the desired destination for selection of the destination. This enables setting of the address and number of the destination without input of the corresponding address and number necessitated.

SUMMARY

A display/input device according to the present disclosure includes a storage section, a display section, a touch panel, a control section, and a recognition section. The storage section is configured to store destination data indicating plural pieces of address information including a plurality of destination names and plural pieces of destination information corresponding to the plurality of destination names. The display section is configured to display a screen. The touch panel is configured to detect user's touched point. The control section is configured to allow the display section to display a list for specifying a destination name of the plurality of destination names on the basis of the destination data. The recognition section is configured to recognize a moving direction in which the touched point moves. When the recognition section recognizes the moving direction of the touched point, the control section allows the display section to display the list in plural pages in the moving direction.

An image forming apparatus according to the present disclosure includes the above described display/input device according to the present disclosure, and an image reading device configured to read an original document to obtain image data of the original document.

DETAILED DESCRIPTION

Figure 1:
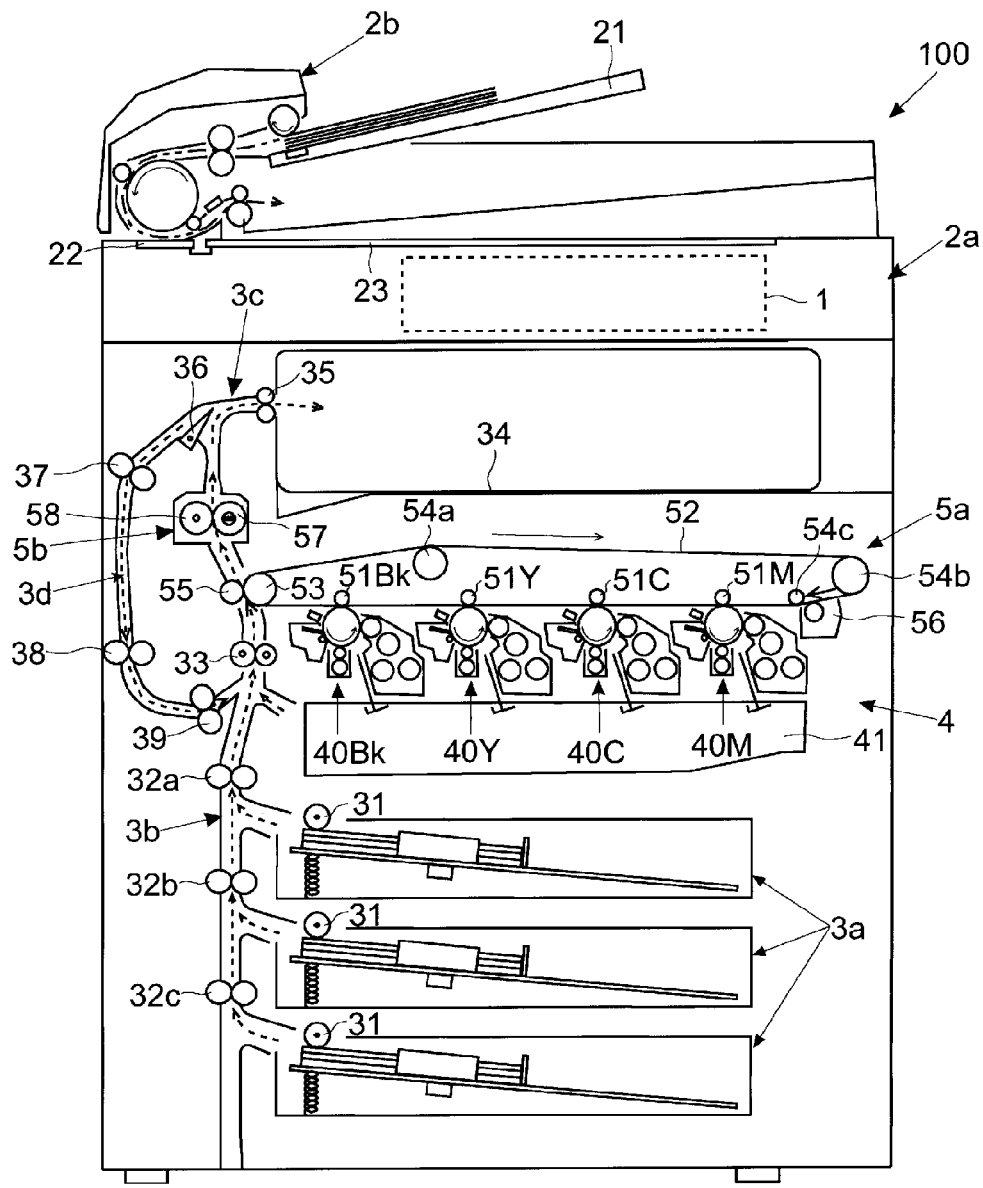
FIG. 1 is a schematic front cross sectional view showing one example of a multifunction peripheral according to one embodiment of the present disclosure.

Embodiments will be described below with reference to FIGS. 1-16. In the drawings, like numerals denote like or corresponding elements to omit description thereof. Description will be made below about a multifunction peripheral 100 (corresponding to an image forming apparatus) including an operation panel 1 (corresponding to a display/input device) as one example. It should be noted that the configuration, arrangement, etc. of each element are only examples and not intended to limit the scope of the disclosure.

(Overview of Image Forming Apparatus)

First, the multifunction peripheral 100 according to one embodiment will be schematically described with reference to FIG. 1. FIG. 1 is a schematic front cross sectional view showing one example of the multifunction peripheral 100.

As shown in FIG. 1, an operation panel 1, which will be described later, for various settings of the multifunction peripheral 100 is provided in the front of the multifunction peripheral 100. Further, as shown in FIG. 1, the multifunction peripheral 100 in the present embodiment includes on the top thereof an image reading section 2a and an original document feeder 2b. The multifunction peripheral 100 includes thereinside a plurality of paper feeders 3a, a conveyance section 3b, an image forming section 4, an intermediate transfer section 5a, a fusing section 5b, an ejection/conveyance section 3c, a duplex/conveyance section 3d, etc.

The original document feeder 2b includes a document feed tray 21. Original documents to be subjected to copying or scanning are placed on the document feed tray 21. Then, the original document feeder 2b conveys the original documents from the document feed tray 21 sheet by sheet automatically in a consecutive manner to a reading station (a contact glass 22 for forwarding/reading). Further, the original document feeder 2b is mounted on the image reading section 2a. The original document feeder 2b is openable/closable in the vertical direction about the rear edge of the original document feeder 2b as an axis. The original document feeder 2b functions as a cover that presses contact glasses (the contact glass 22 for forwarding/reading and a contact glass 23 for placing/reading) of the image reading section 2a from above the contact glasses.

As shown in FIG. 1, the contact glass 22 for forwarding/reading and the contact glass 23 for placing/reading are disposed on the top of the image reading section 2a. The contact glass 23 for placing/reading is a glass on which an original document is to be placed when original documents, such as a book, is to be read page by page. Further, a lamp, a mirror, a lens, an image sensor, etc. (not shown) are provided inside the image reading section 2a. The image sensor reads an original document according to light reflected by the original document, which the original document feeder 2b allows to pass on the contact glass 22 for forwarding/reading or which is placed on the contact glass 23 for placing/reading. Then, the image sensor converts the reflected light to an analog electrical signal according to an image density for quantization of the electrical signal. Thus, image data of the original document is obtained. It is noted that the image reading section 2a of the present embodiment is readable both in color and monochrome.

The respective paper feeders 3a in the multifunction peripheral 100 accommodate plural pieces of various paper (e.g., copier paper, recycled paper, cardboard, viewgraphs, etc.) in various sizes (e.g., standard-size paper in A size, such as A4, B size, such as B4, letter size paper, etc.). Each paper feeder 3a includes a paper feed roller 31 that is driven and rotated to forward the paper sheet by sheet to the conveyance section 3b in printing.

The conveyance section 3b forms a path through which the paper is conveyed from the paper feeders 3a to the image forming section 4. There are provided in the conveyance section 3b a guide plate, conveyance roller pairs 32 (three in total of a conveyance roller pair 32a, a conveyance roller pair 32b, and a conveyance roller pair 32c from above in FIG. 1), a registration roller pair 33, etc. The guide plate is a plate to guide the paper. The conveyance roller pairs 32 are driven and rotated in paper conveyance. The registration roller pair 33 stops the conveyed paper before the image forming section 4 and feeds it at transfer timing of a formed toner image.

The image forming section 4 includes a plurality of image forming units 40 (a black image forming unit 40Bk, a yellow image forming unit 40Y, a cyan image forming unit 40C, and a magenta image forming unit 40M) and an exposure device 41. Each of the image forming units 40 includes a photosensitive drum, an electrostatic charger, a developing unit, cleaner, etc. The photosensitive drum is supported in a manner that can be driven and rotated. The electrostatic charger, the developing unit, and the cleaner are provided around the photosensitive drum. The exposure device 41 scans and exposes each photosensitive drum on the basis of image data read in the image reading section 2a, image data stored in a storage device 62 (corresponding to a storage section), which will be described later, or the like, while outputting so as to blink laser light. Thus, toner images are formed on the peripheral surfaces of the photosensitive drums by the image forming units 40 and the exposure device 41.

The intermediate transfer section 5a receives the toner images from the respective image forming units 40 as primary transfer and performs secondary transfer on the paper. The intermediate transfer section 5a includes a plurality of primary transfer rollers 51 (a primary transfer rollers 51Bk to a primary transfer roller 51M), an intermediate transfer belt 52, a drive roller 53, a plurality of driven rollers 54 (a driven roller 54a to a driven roller 54c), a secondary transfer roller 55, a belt cleaner 56, etc. The intermediate transfer belt 52 is wound to the drive roller 53 and the like with tension applied. This allows the intermediate transfer belt 52 to be rotated through the drive and rotation of the drive roller 53 connected to a drive mechanism, such as a motor (not shown). Subsequently, voltage for transfer is applied to the primary transfer rollers 51Bk to 51M, thereby transferring the toner images on the respective photosensitive drums to the intermediate transfer belt 52. After the toner images are primarily transferred to the intermediate transfer belt 52 in a manner that they are overlaid with each other without displacement, the secondary transfer roller 55, to which predetermined voltage is applied, transfers the overlaid toner images to the paper.

The fusing section 5b fuses the toner images transferred to the paper. The fusing section 5b includes a heating roller 57, in which a heating element is built, and a pressure roller 58. The pressure roller 58 is in contact with and pressed by the heating roller 57. Next, when the paper passes through a nip formed between the heating roller 57 and the pressure roller 58, the toner is heated and melts, thereby fusing the toner images to the paper. The paper ejected from the fusing section 5b is sent toward the exit tray 34.

The ejection/conveyance section 3c turns the printed paper toward either the exit tray 34 or the duplex/conveyance section 3d. The ejection/conveyance section 3c includes an ejection roller pair 35. The ejection roller pair 35 is driven and rotated in the forward rotation direction to send out the paper toward the exit tray 34. Alternatively, the ejection roller pair 35 is rotated in the backward rotation direction for switch back in duplex printing. Further, the ejection/conveyance section 3c includes a changeover valve 36 for switch over of the paper conveyance direction. The changeover valve 36 rotates. The changeover valve 36 is located at an original position where the path to the duplex/conveyance section 3d is closed to guide the paper toward the exit tray 34. By contrast, in duplex printing, the changeover valve 36 rotates to guide the paper, which has been subjected to simplex copying and switch back, toward the duplex/conveyance section 3d. The duplex/conveyance section 3d connects the downstream side of the fusing section 5b to the upstream side of the registration roller pair 33. The duplex/conveyance section 3d includes a plurality duplex/conveyance roller pairs 37-39 that are driven and rotated for duplex printing. Thus, the paper subjected to simplex printing is conveyed to the duplex/conveyance section 3d.

(Operation Panel 1)

Figure 2:
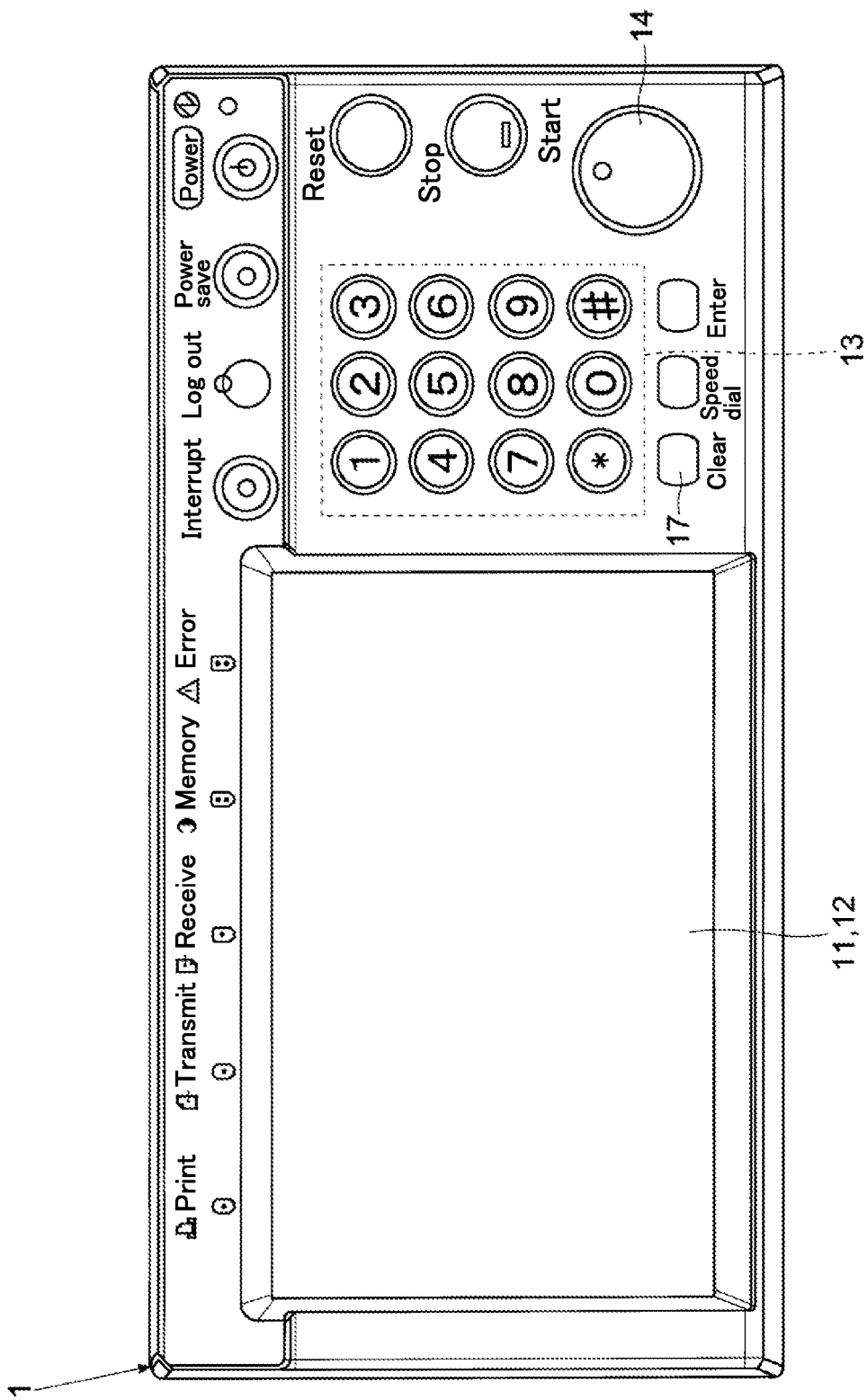
FIG. 2 is a plan view showing one example of an operation panel according to one embodiment of the present disclosure.

With reference to FIGS. 1 and 2, one example of the operation panel 1 according to the present embodiment will be described next. FIG. 2 is a plan view showing one example of the operation panel 1.

The operation panel 1 is provided at the upper part of the front surface of the multifunction peripheral 100. The operation panel 1 includes a display section 11, a touch panel 12, and hard keys (e.g., a numeric keypad 13 for numerical input, a start key 14 for copying start or another processing start, etc.).

For example, the display section 11 is a liquid crystal display panel. The display section 11 may be a display panel of any other type, such as an organic EL panel. The display section 11 displays menus and keys for setting of the multifunction peripheral 100. The user can specify a key displayed on the display section 11 to input various settings of the multifunction peripheral 100. Further, the display section 11 displays various types of images for state massages and the like of the multifunction peripheral 100.

Furthermore, a touch panel 12 is provided on the top of the display section 11. The touch panel 12 detects the position or coordinates where the user touches. Comparison of the position where the key is displayed with the position of the touched point results in specification of the key that the user specifies, thereby receiving the user's input.

The touch panel 12 can recognize a plurality of points that are simultaneously touched. In view of this, a projected capacitive touch panel may be employed as the touch panel 12, for example. It is noted that the touch panel 12 is required only to recognize a plurality of points that are simultaneously touched and is not necessarily limited to the touch panel 12 of capacitive type.

In order to transmit image data, the display section 11 of the present embodiment can display a list 9 including a plurality of destination names and plural pieces of corresponding transmission information on the basis of destination data 7, which will be descried later, stored in advance in the multifunction peripheral 100. When the user specifies a desired destination from the destinations displayed in the list 9, the number or address of the destination can be set without input of the number or address of the destination necessitated (details will be described later).

(Hardware Configuration of Multifunction Peripheral 100 and the Like)

Figure 3:
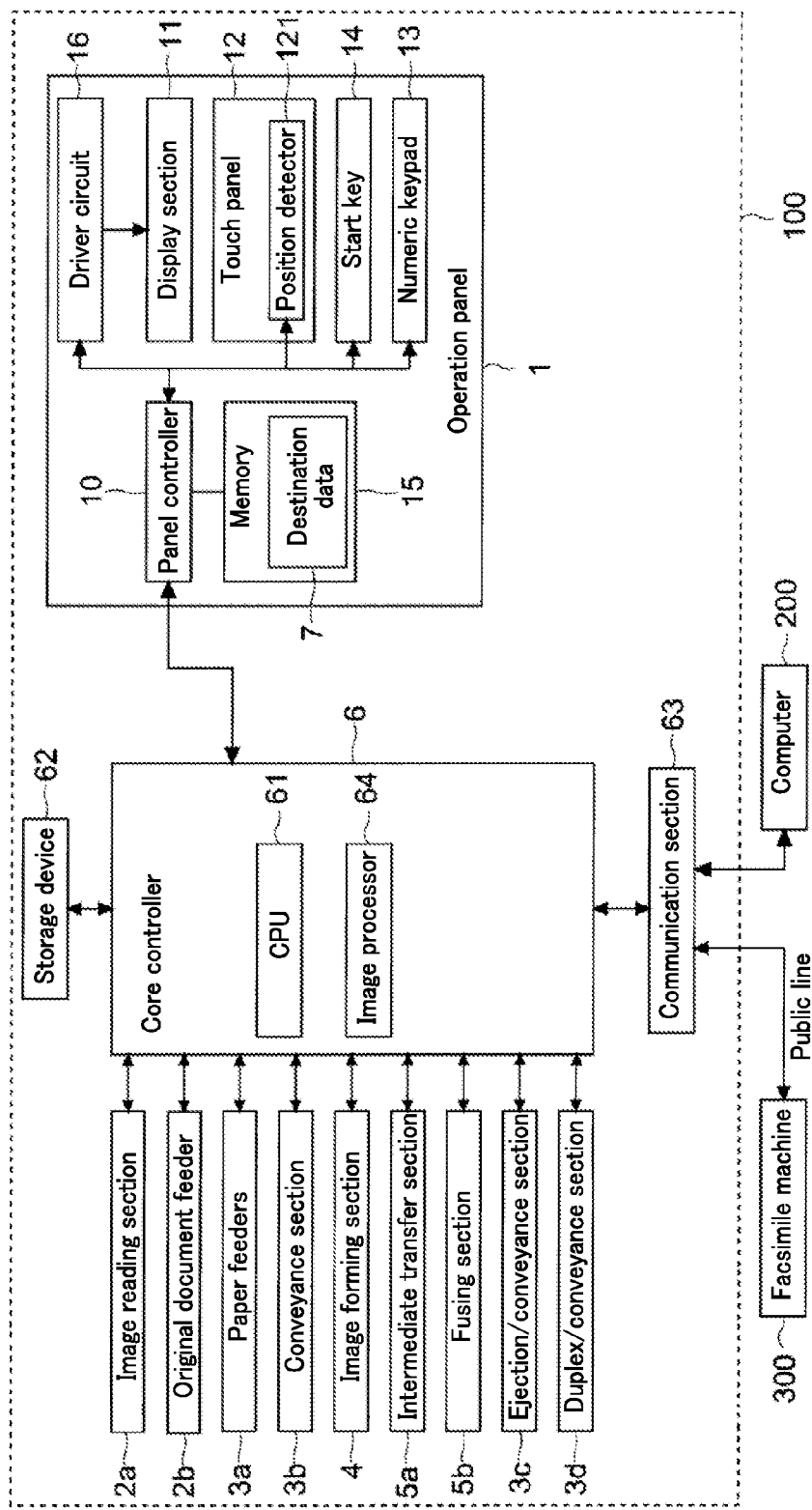
FIG. 3 is a block diagram showing one example of hardware configurations of the multifunction peripheral and the operation panel according to one embodiment of the present disclosure.

With reference to FIG. 3, one example of hardware configurations of the multifunction peripheral 100 and the operation panel 1 according to the present embodiment will be described next. FIG. 3 is a block diagram showing one example of hardware configurations of the multifunction peripheral 100 and the operation panel 1.

A core controller 6 is provided in the multifunction peripheral 100. For example, the core controller 6 is connected to the operation panel 1, the original document feeder 2b, the image reading section 2a, the paper feeders 3a, the conveyance section 3b, the image forming section 4, the fusing section 5b, the ejection/conveyance section 3c, etc. and controls them.

For example, the core controller 6 includes elements for control, such as a central processing unit (CPU) 61, etc. The CPU 61 performs arithmetic operation and the like on the basis of control programs, which are stored and loaded in a storage device 62, to control the respective parts of the multifunction peripheral 100. It is noted that the core controller 6 may be divided into plural parts for the respective sections, such as a main control section, an engine controller, etc. The main control section performs entire control and image processing. The engine controller performs ON/OFF control of motors, etc. to rotate various rotary members, image formation, and the like, thereby controlling printing. The present specification describes the core controller 6 in which the main control section and the engine controller are combined together.

The storage device 62 is connected to the core controller 6. The storage device 62 is a combination of a nonvolatile device and a volatile device, such as a ROM, a RAM, a HDD, etc. The storage device 62 can store various types of data, such as control programs, control data, setting data, image data, etc. for the multifunction peripheral 100.

The core controller 6 is connected to an interface section (hereinafter referred to as a communication section 63), which includes various types of connectors and/or sockets, a facsimile modem, etc. The communication section 63 is connected via a network and/or a public line or the like to a plurality of external computers 200 (e.g., a personal computer and a server) and other facsimile machines 300 (only one is shown for each of them in FIG. 3 for the sake of convenience). For example, the core controller 6 can allow the storage device 62 to store image data obtained in the image reading section 2a (box function) and can transmit the image data obtained in the image reading section 2a to an external computer 200 or another facsimile machine 300 (scan function, fax function, and internet fax function). Further, the core controller 6 can also perform printing, faxing, etc. on the basis of image data, which is transmitted from an external computer 200 or another facsimile machine 300 and input to the multifunction peripheral 100 (printing function and fax function).

Further, for example, the core controller 6 includes an image processor 64. The image processor 64 processes image data obtained by reading an original document in the image reading section 2a or image data input to the multifunction peripheral 100 through the communication section 63. For example, the image data processed by the image processor 64 is transmitted to the exposure device 41 for scan and exposure of the photosensitive drums, or is stored in the storage device 62.

Further, the core controller 6 recognizes input to the operation panel 1 to control the multifunction peripheral 100 so that a job, such as copying, scanning, transmission, or the like is performed in accordance with the user's setting. The operation panel 1 in the present embodiment includes a panel controller 10 (corresponding to a control section and a recognition section), the display section 11, the touch panel 12, the hard keys (e.g., the numeric keypad 13 and the start key 14), a memory 15 (corresponding to a storage section), a driver circuit 16, etc. The panel controller 10 is composed of a CPU, an integrated circuit (IC), etc. The panel controller 10 controls display of the display section 11, receives output from the touch panel 12, and specifies the position (coordinates) of a touched point. The memory 15 stores data of a table or the like that indicates the relationship between the output from the touch panel 12 and the position (coordinates). The memory 15 includes a ROM and RAM. The panel controller 10 compares the position of the touched point with a position of the image on a screen that the display section 11 displays in touching to recognize a key displayed at the touched point. Thus, the panel controller 10 recognizes the key that the user specifies.

The user selects a function from the various functions of the multifunction peripheral 100 in normal operation. Then, the user selects a parameter, which is settable in the selected function (e.g., scaling, density, N-in-1, duplex, etc. when the copying function is selected). Subsequently, the user sets a parameter value of the selected parameter. In such function selection and setting, the user repeats specification (selection) of keys displayed on the display section 11, starting from a display screen at the top of a hierarchy of the display section 11. The display screen of the display section 11 is accordingly switched by each key specification (selection). Finally, the parameter value of the target function to be set is set. The panel controller 10 recognizes function selection and setting and transmits the set content to the core controller 6. The core controller 6 accordingly allows each part of the image forming section 4, etc. to perform the operation corresponding to the function selected and set through the operation panel 1 so that the user's intention is reflected to the job, such as printing.

Image data of screens or images to be displayed on the display section 11 is stored in, for example, the memory 15 in the operation panel 1. The panel controller 10 reads out image data of a screen or an image to be displayed next from the memory 15 in accordance with a key displayed at the position of the touched point. It is noted that the storage device 62 may store the image data of the screens or images that the display section 11 displays. In this case, the operation panel 1 receives the image data for display on the display section 11 from the storage device 62 via the core controller 6. The panel controller 10 provides an instruction to the driver circuit 16 (e.g., a liquid crystal driver IC where the display section 11 is a liquid crystal display panel) to allow the display section 11 to perform display on the basis of the image data. The driver circuit 16 actually controls display of the display section 11. It is noted that the operation panel 1 may not include the panel controller 10 and the memory 15, while the core controller 6 (CPU 61 and the storage device 62) functions as the panel controller 10 and the memory 15. In this case, the core controller 6 or the storage device 62 functions also as a controller of the operation panel 1 (display/input device) or the memory 15.

Further, the touch panel 12 includes a position detector 121 configured to detect a touched point. For example, the position detector 121 is an IC for detection of a touched point (coordinates of a touched point). For example, where the touch panel 12 includes a projected capacitive panel, the position detector 121 detects change in capacitance in the touch panel 12 to output a signal indicative of the position of one point or the positions of simultaneously touched plural points. The panel control section 10 recognizes the position (s) of touched point(s) on the basis of the output from the position detector 121.

(Destination Data 7 and Registration of Address Information)

Figure 4:
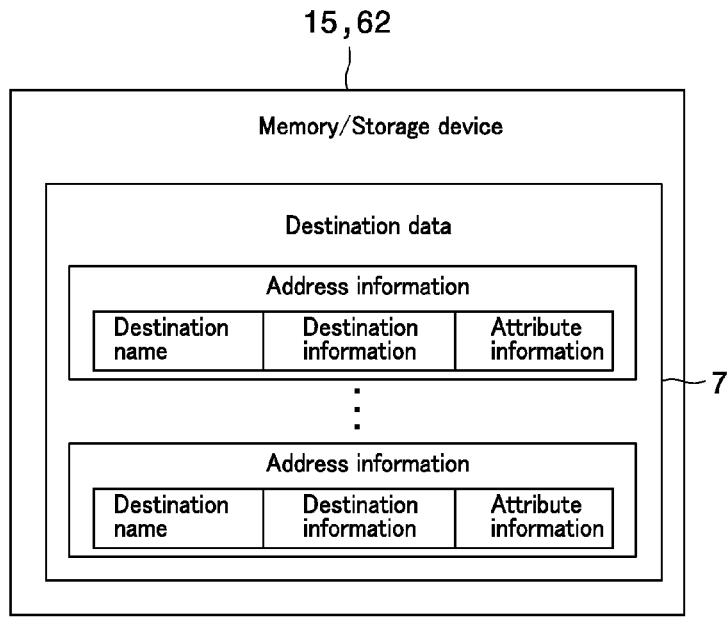
FIG. 4 is an explanatory drawing showing one example of a conception of a configuration of destination data in one embodiment of the present disclosure.
Figure 5:
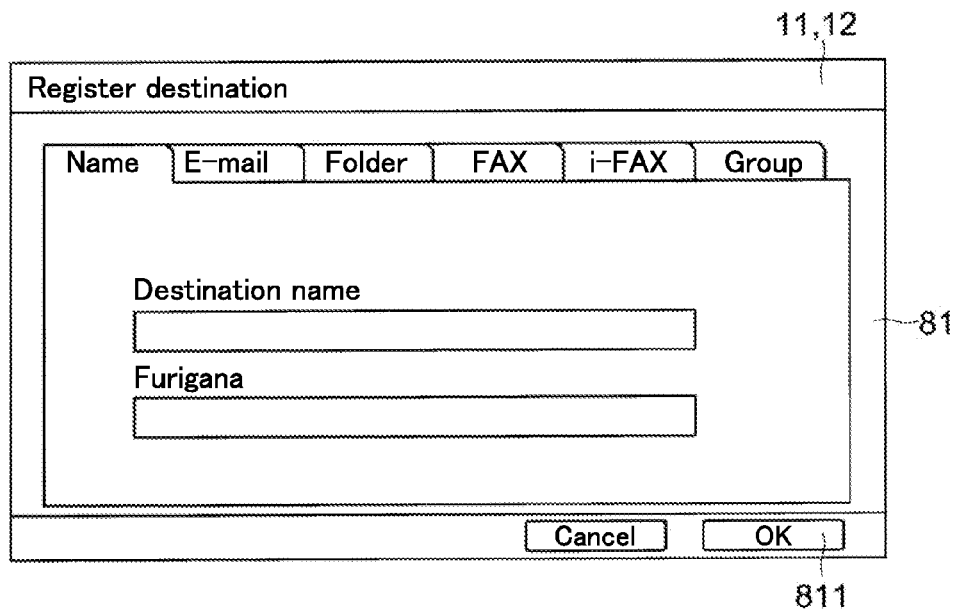
FIG. 5 is an explanatory drawing showing one example of an address information registration screen according to one embodiment of the present disclosure.
Figure 6:
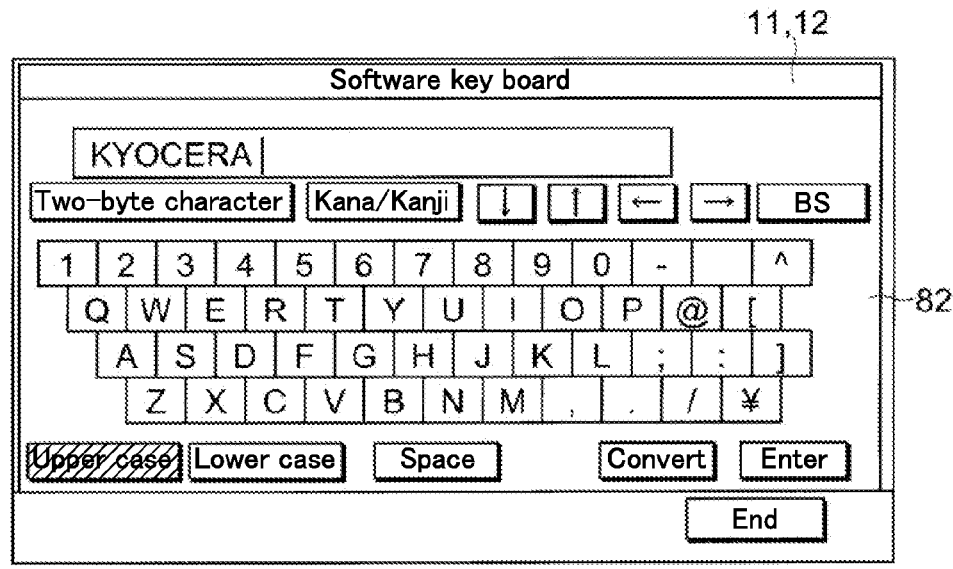
FIG. 6 is an explanatory drawing showing one example of a software keyboard screen according to one embodiment of the present disclosure.

Description will be made next about registration of address information displayed on the display section 11 and destination data 7. FIG. 4 is an explanatory drawing showing one example of a concept of a configuration of the destination data 7. FIG. 5 is an explanatory drawing showing one example of an address information registration screen 81. FIG. 6 is an explanatory drawing showing one example of a software keyboard screen 82.

The memory 15 or the storage device 62 of the operation panel 1 in the multifunction peripheral 100 according to the present embodiment stores the destination data 7 in order not to necessitate input of the address or the FAX number of a destination in each transmission. As shown in FIG. 4, in order to display information on destinations on the display section 11 so as to allow a destination to be set only by specifying the information on the destination, the memory 15 of the operation panel 1 (or the storage device 62) stores the destination data 7.

The destination data 7 includes plural pieces of address information. In the present embodiment, the memory 15 or the storage device 62 can store several-thousand pieces of address information as the destination data 7. As shown in FIG. 4, one piece of address information is counted for one destination name. Each piece of the address information is a combination of data indicating a destination name (addressed name) and data indicating destination information, such as a number or address corresponding to the destination name or data indicating attribute information attached for the convenience sake, such as for classification of data and the like. Accordingly, the destination data 7 is an aggregation of plural pieces of address information.

In order to register new address information, the user operates the touch panel 12. When the touch panel 12 receives through input by the user an instruction to display the address information registration screen 81 for registration of address information, the panel control section 10 allows the display section 11 to display the address information registration screen 81 as shown in FIG. 5. For example, when the user touches an area where a blank space is displayed, the panel control section 10 allows the display section 11 to display the software keyboard screen 82 as shown in FIG. 6. Through this software key board, characters, numerals, signs, etc. can be input. The user touches an area where a tub is displayed on the address information registration screen 81 and inputs a desired item (destination information, such as a destination name, FAX number, email address, network pass, etc.). It is noted that the destination name is the essential item to be input.

Here, in the operation panel 1 of the multifunction peripheral 100 according to the present embodiment, plural types of destination information corresponding to a plurality of (e.g., five) transmission methods can be registered for each name (destination name). Specifically, five destination addresses (destination information) of a facsimile terminal address (FAX number), a network facsimile address, an email address, a server message block (SMB) folder address, and a file transfer protocol (FTP) folder address can be registered for each name (destination name). It is noted that the facsimile terminal address can be registered through a tub screen of "FAX". The network facsimile address can be registered through a tub screen of "i-FAX". The email address can be registered through a tab screen of "E-mail". Further, the SMB folder address and the FTP folder address can be registered through tub screens of "Folder" and "Group", respectively. The "Folder" and the "Group" can be hierarchized. These input contents are stored as the destination information in the memory 15 or the storage device 62.

When an area where an OK key 811 is displayed on the address information registration screen 81 is touched, the panel control section 10 allows the memory 15 or the storage device 62 to store address information including the input destination name or destination information. The memory 15 or the storage device 62 accordingly updates the destination data 7.

(Destination Setting Screen 83 and Specification of Destination)

Figure 7:
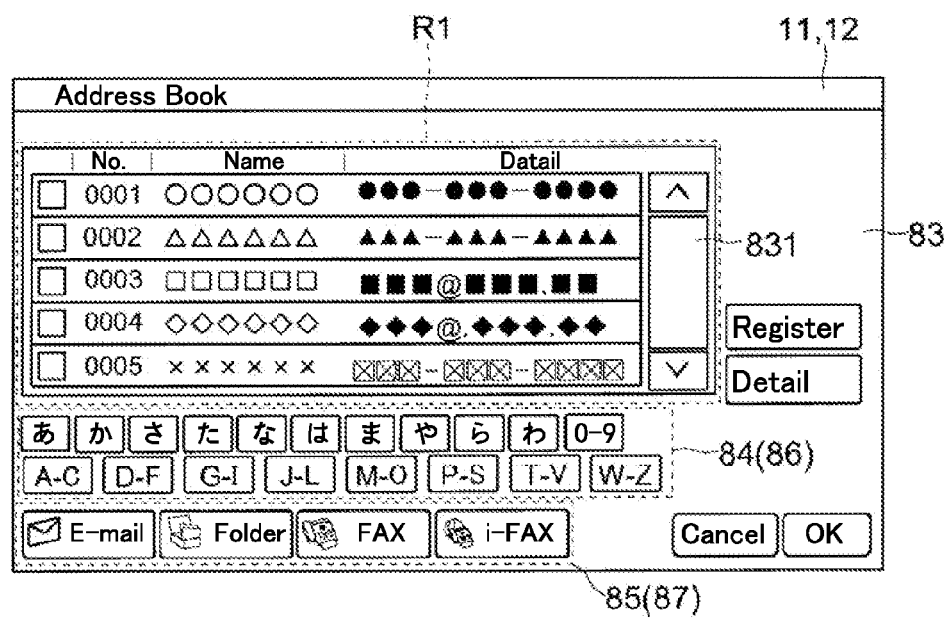
FIG. 7 is an explanatory drawing showing one example of a destination setting screen according to one embodiment of the present disclosure

One example of the destination setting screen 83 displayed on the operation panel 1 and specification of a destination will be described next with reference to FIG. 7. FIG. 7 is an explanatory drawing showing one example of the destination setting screen 83.

The operation panel 1 of the multifunction peripheral 100 according to the present embodiment has an address book function (destination management system) of managing destinations to which data is transmitted. In order to transmit image data by the facsimile, the internet facsimile, or the like (transmission of image data to a registered address), the user makes the display section 11 to display the destination setting screen 83. When the touch panel 12 receives an instruction to display the destination setting screen 83, as shown in FIG. 7, the panel control section 10 allows the display section 11 to display the destination setting screen 83. The destination setting screen 83 displays the address book in an address book display region R1 (address book function).

The display section 11 displays plural pieces of address information registered in advance (stored in advance in the memory 15 or the storage device 62) in the address book display region R1. In the example shown in FIG. 7, five pieces of address information are displayed in the address book display region R1 in a listed fashion.

Specifically, the panel control section 10 of the present embodiment references the destination data 7 stored in the memory 15 or the storage device 62. Then, the panel control section 10 allows the display section 11 to display a destination name and destination information for each piece (for each piece of address information). Further, the panel control section 10 allows the display section 11 to display the number assigned at registration (No. or attribute information) or a checkbox together with the destination name and the destination information of the piece.

A scroll bar 831 is provided in the address book display region R1. Each time the user touches the scroll bar 831, the panel control section 10 allows the display section 11 to scroll the displayed content in the address book display region R1. According to the scrolling direction, the panel control section 10 allows the display section 11 to delete the display of the destination name or the destination information located at the highest rank or the lowest rank and to display a new destination name or destination information.

Subsequently, when the touch panel 12 recognizes an event that an area where the address information is displayed is touched, the panel control section 10 recognizes that the destination (address information) displayed in the touched area is specified. When the operation panel 1 receives an instruction of a transmission job (e.g., the start key 14 is pushed), and the transmission job is executed, the panel control section 10 or the core control section 6 transmits image data to the specified destination (FAX number or address). Thus, the destination can be set through the destination setting screen 83.

Here, in the case where many pieces (e.g., several hundred to several thousand pieces) of address information are registered, it is difficult to specify a specific address information among all the address information. In view of this, a first refinement key group 84 configured to refine the address information with an initial character of a destination name and a second refinement key group 85 configured to refine the address information with the type of a transmission method are arranged on the destination setting screen 83.

The first refinement key group 84 includes a plurality of first refinement keys 86 for refinement, such as keys indicating alphabet groups (e.g., "A-C", etc.), keys indicating the initial Hiragana characters of the respective rows in the Japanese syllabary, and numerals keys. It is noted that the keys indicating the Hiragana characters expressing the respective rows in the Japanese syllabary are keys for users that uses Japanese. The first refinement key group 84 may not necessarily include the keys indicating the Hiragana characters expressing the respective rows in the Japanese syllabary. The user's touch in an area where any of the first refinement keys 86 is displayed can narrow a range that displays address information in the destination data 7 with the character indicated on the first refinement key 86.

For example, when the touch panel 12 receives touch to an area where a first refinement key 86 indicating a Hiragana character of "A" in the Japanese syllabary is displayed, the panel control section 10 generates refinement data, which is destination data 7 refined into address information (destination names and destination information) of only destination names with pronunciation belonging to the "A row" in the Japanese syllabary. Next, the panel control section 10 allows the display section 11 to display only the address information of the destination names with the pronunciation belonging to the "A row" in the Japanese syllabary on the basis of the refinement data (e.g., to display it in the address book display region R1).

Alternatively, for example, when the touch panel 12 receives touch to an area where a first refinement key 86 indicating "A-C" in the alphabet is displayed, the panel control section 10 generates refinement data, which is destination data 7 refined into address information of only destination names bearing an initial character of "A (a)", "B (b)", or "C (c)". Then, the panel control section 10 allows the display section 11 to display only the address information of the destination names bearing the initial character of "A (a)", "B (b)", or "C (c)" on the basis of the refinement data (the same is applied to the first refinement keys 86 indicating the other alphabet ranges).

The second refinement key group 85 includes a plurality of keys indicating transmission methods. Specifically, the second refinement key group 85 includes second refinement keys 87 of "E-mail", "Folder", "FAX", "i-FAX", and "Group", which are transmission methods different from one another. When the user touches an area where any of the second refinement keys 87 of the second refinement key group 85 is displayed, only address information, in which a transmission method of the destination information (destination address) corresponding to the operated second refinement key 87 is registered, is displayed on the destination setting screen 83 (refinement). It is noted that the multifunction peripheral 100 in the present embodiment is capable of simultaneously selecting a plurality of second refinement keys 87 (e.g., "FAX" and "i-FAX"). Further, refinement through the first refinement key 86 can be performed, while refinement through the second refinement key 87 is performed.

Furthermore, for example, when the touch panel 12 receives touch to an area where the second refinement key 87 indicating "FAX" is displayed, the panel control section 10 generates refinement data, which is destination data 7 refined into only address information in which a FAX numbers is registered. Then, the panel control section 10 allows the display section 11 to display only the address information in which the FAX number is registered on the basis of the refinement data.

(Operation to Call Up List 9)

Figure 8:
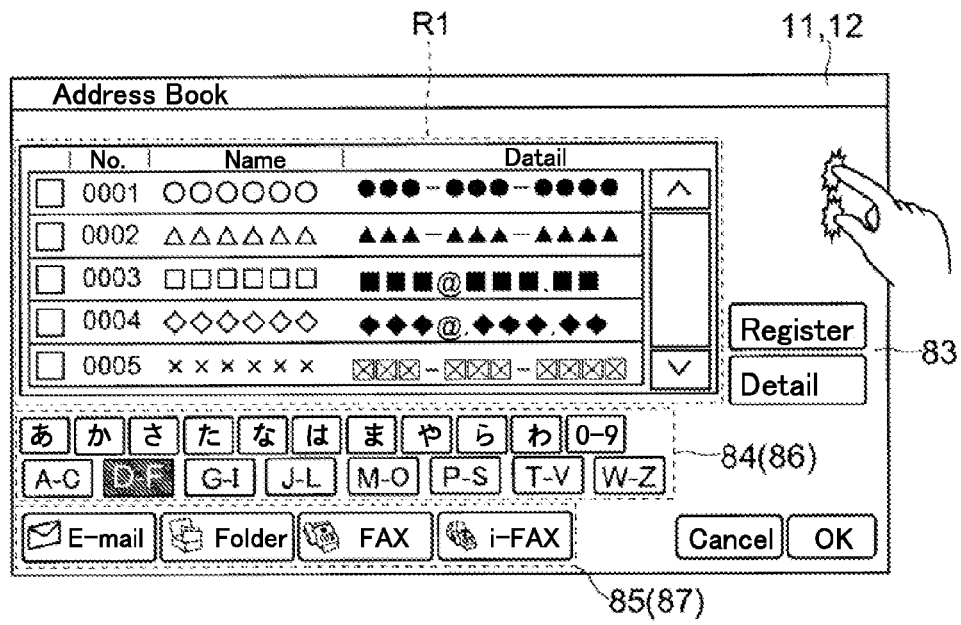
FIG. 8 is an explanatory drawing showing one example of a list call-up operation according to one embodiment of the present disclosure.
Figure 9:
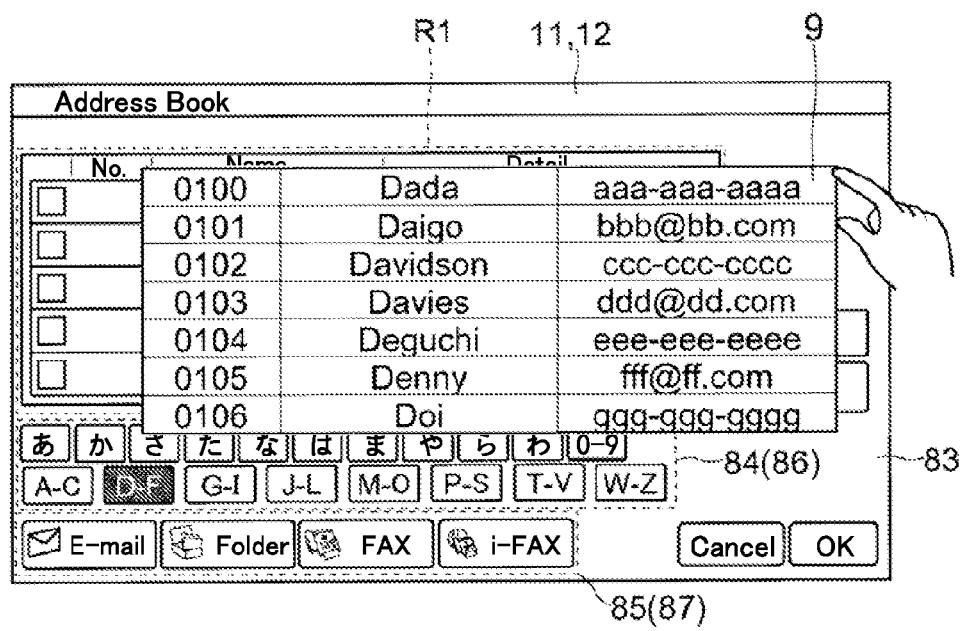
FIG. 9 is an explanatory drawing showing one example of a list displayed on the destination setting screen according to one embodiment of the present disclosure.

With reference to FIGS. 8 and 9, one example of an operation to call up the list 9 will be described next. FIG. 8 is an explanatory drawing for explaining one example of the operation to call up the list 9. FIG. 9 is an explanatory drawing showing one example of the list 9 displayed on the destination setting screen 83.

As described above, in the operation panel 1 of the multifunction peripheral 100 according to the present embodiment, in order to specify a destination to which image data is to transmit, the destination setting screen 83 is displayed, and the range of address information to be displayed is set through a first refinement key 86 or a second refinement key 87. Then, the user allows the address book display region R1 to display a desired destination through a scroll key or the like. Thereafter, the user's touch to an area where the desired destination is displayed can specify the destination.

However, even such refinement may result in display of many pieces (several ten to a hundred or more pieces) of address information. In this case, if the desired destination is listed later in the refined pieces, it takes comparatively long time to specify the destination. In view of this, in the operation panel 1 of the multifunction peripheral 100 according to the present embodiment, plural pages of the list 9, which indicate plural pieces of address information to specify a destination, are displayed consecutively by an easy and intuitive operation. Accordingly, the desired destination can be specified easily and quickly.

Each page of the list 9 displays plural pieces of address information (up to seven pieces of address information for each page of the list 9 in the present embodiment; see FIG. 9) in a listed fashion. The touch panel 12 receives specification of a destination through touch in an area where a piece of address information (a destination name, FAX number or address) in the list 9 is displayed. Then, the panel control section 10 recognizes the specified destination as a destination to which the image data is to transmit.

In order to call up the list 9 in the operation panel 1 according to the present embodiment, the user touches two points, as shown in FIG. 8. The touch panel 12 receives the two-point touch (detects the two-point touch) on a setting screen relating to a transmission job, such as the destination setting screen 83. The panel control section 10 recognizes, on the basis of the output from the touch panel 12, that execution to call up the list 9 is instructed. It is noted that the instruction to call up the list 9 is not limited to two-point touch, but may be simultaneous touch of three or more points.

Before the list 9 is called up, a range of address information to be displayed in the list 9 can be specified (narrowed) through a first refinement key 86 or a second refinement key 87. The touch panel 12 detects an area where the touched refinement key is displayed. Then, the panel control section 10 generates refinement data, which is destination data 7 refined into address information within a range of address information to be displayed in the list 9 according to the touched refinement key. Next, the panel control section 10 allows the display section 11 to display the list 9 of the address information refined according to the refinement data.

For example, FIGS. 9-15 show examples in which the list 9 is displayed when an area where the first refinement key 86 indicating "D-F" is displayed is touched, so that the address information is refined into address information of destination names bearing the initial character of "D", "E", or "F".

(Processing of Displaying List 9)

Figure 10:
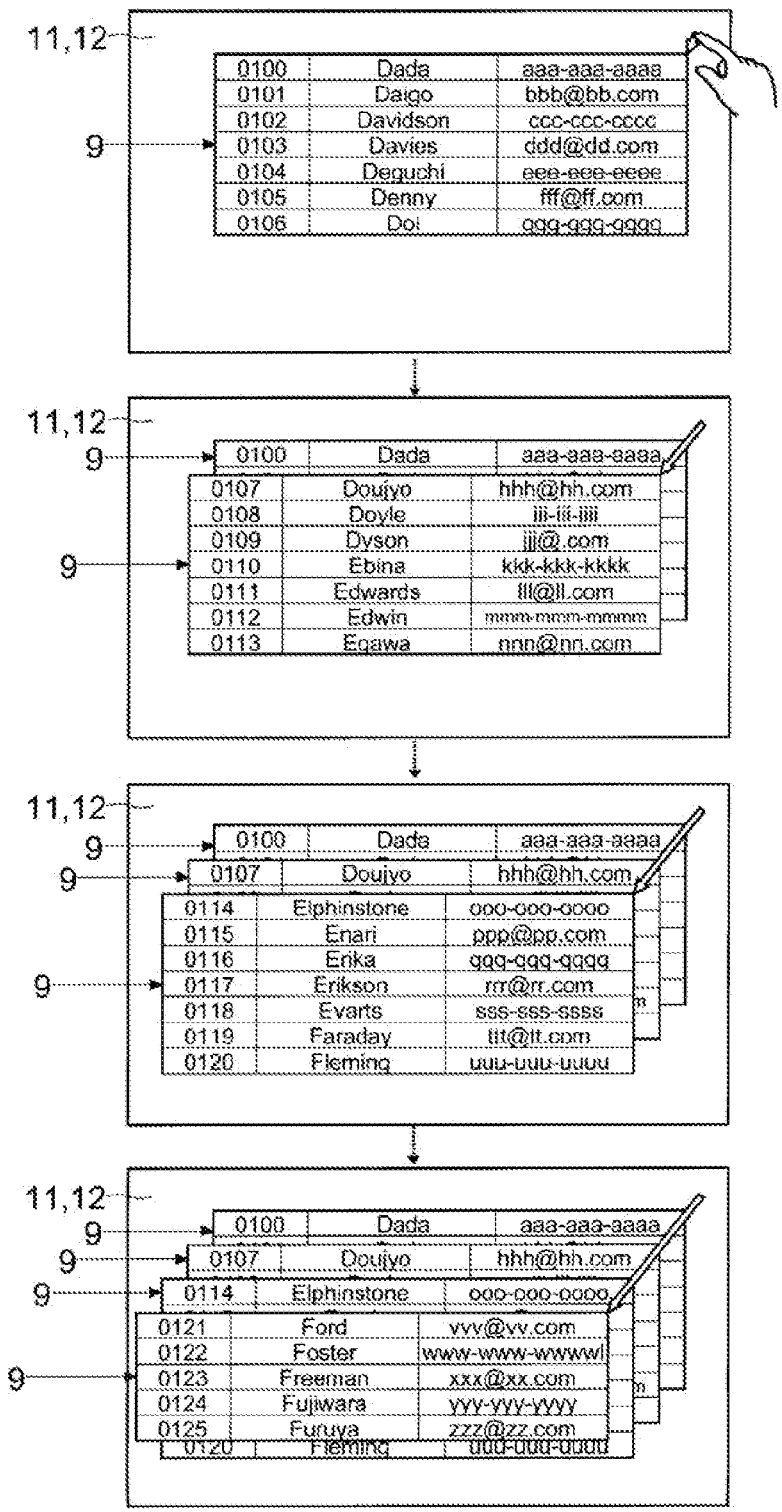
FIG. 10 is an explanatory drawing showing one example in which plural pages of a list is displayed in a direction from top right to bottom left according to one embodiment of the present disclosure.
Figure 11:
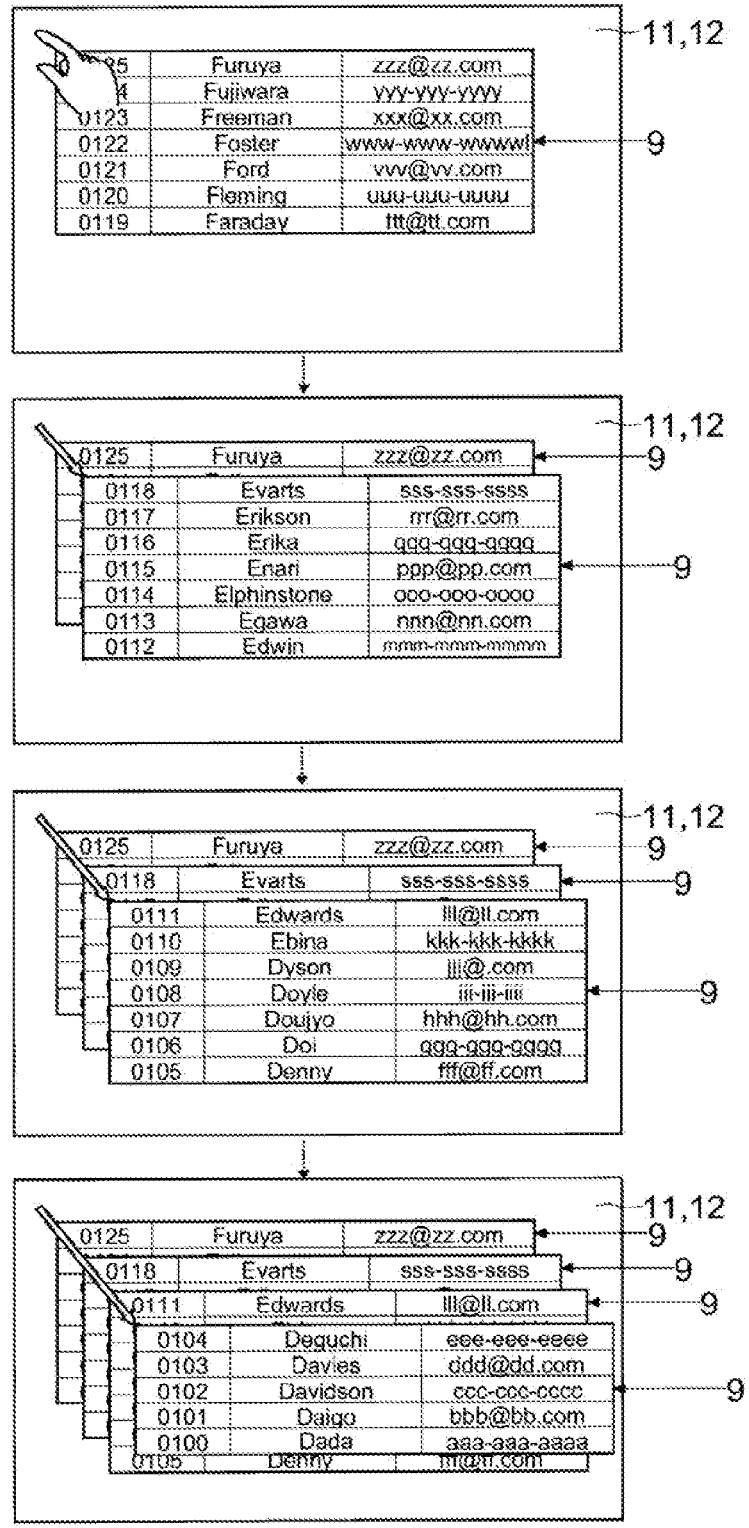
FIG. 11 is an explanatory drawing showing one example in which plural pages of the list is displayed in a direction from top left to bottom right according to one embodiment of the present disclosure.
Figure 12:
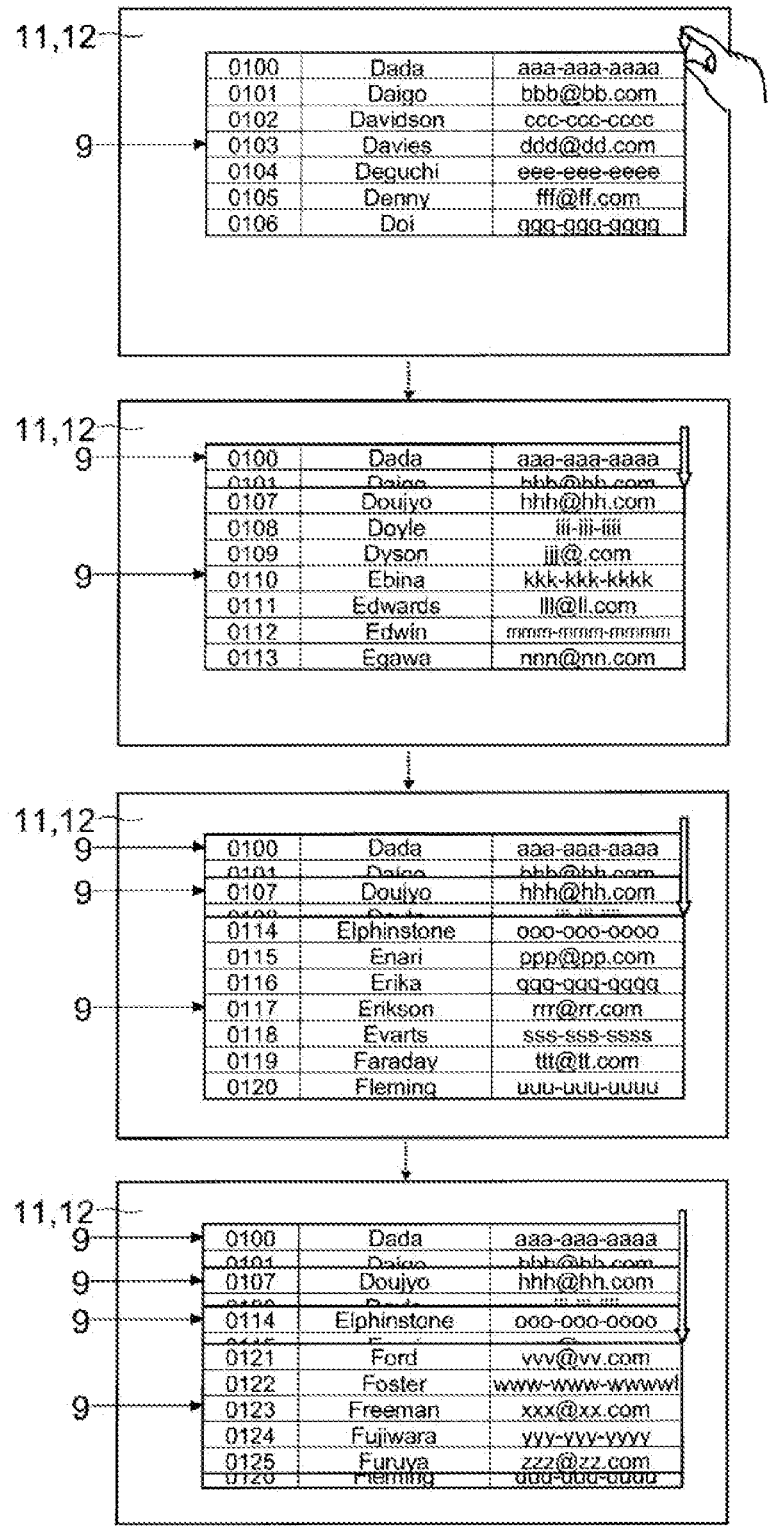
FIG. 12 is an explanatory drawing showing one example in which plural pages of the list is displayed in a direction from top to bottom according to one embodiment of the present disclosure.
Figure 13:
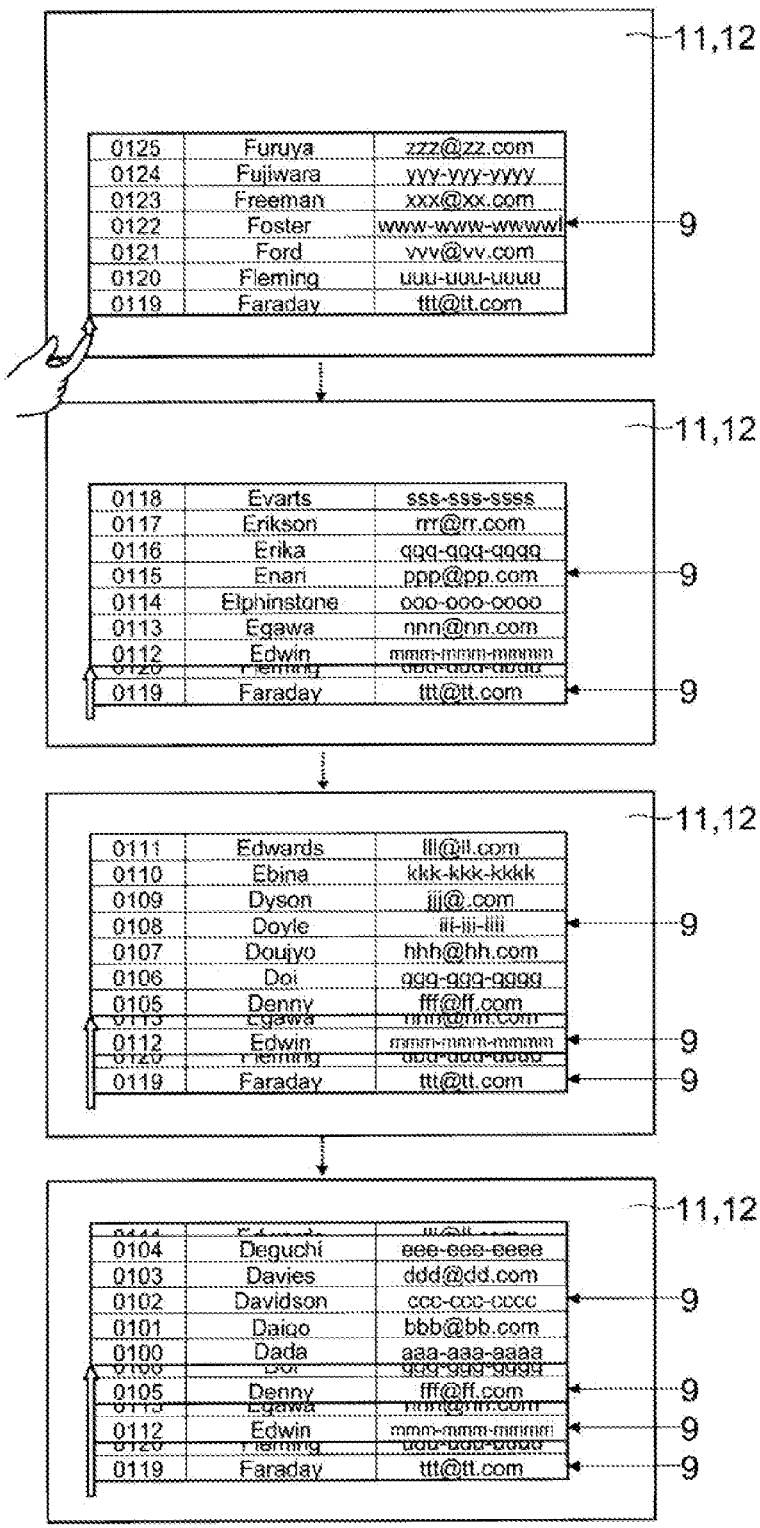
FIG. 13 is an explanatory drawing showing one example in which plural pages of the list is displayed in a direction from bottom to top according to one embodiment of the present disclosure.
Figure 14:
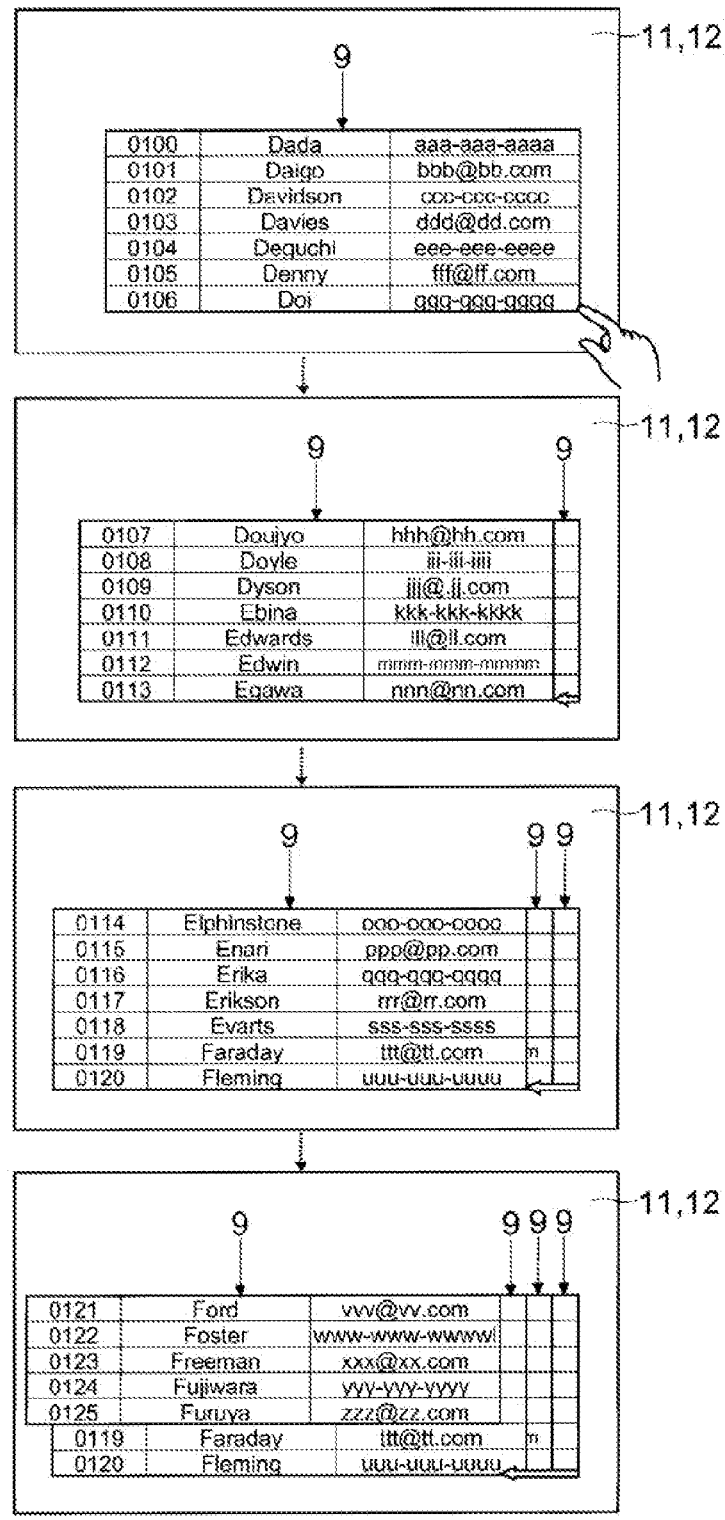
FIG. 14 is an explanatory drawing showing one example in which plural pages of the list is displayed in a direction from right to left according to one embodiment of the present disclosure.
Figure 15:
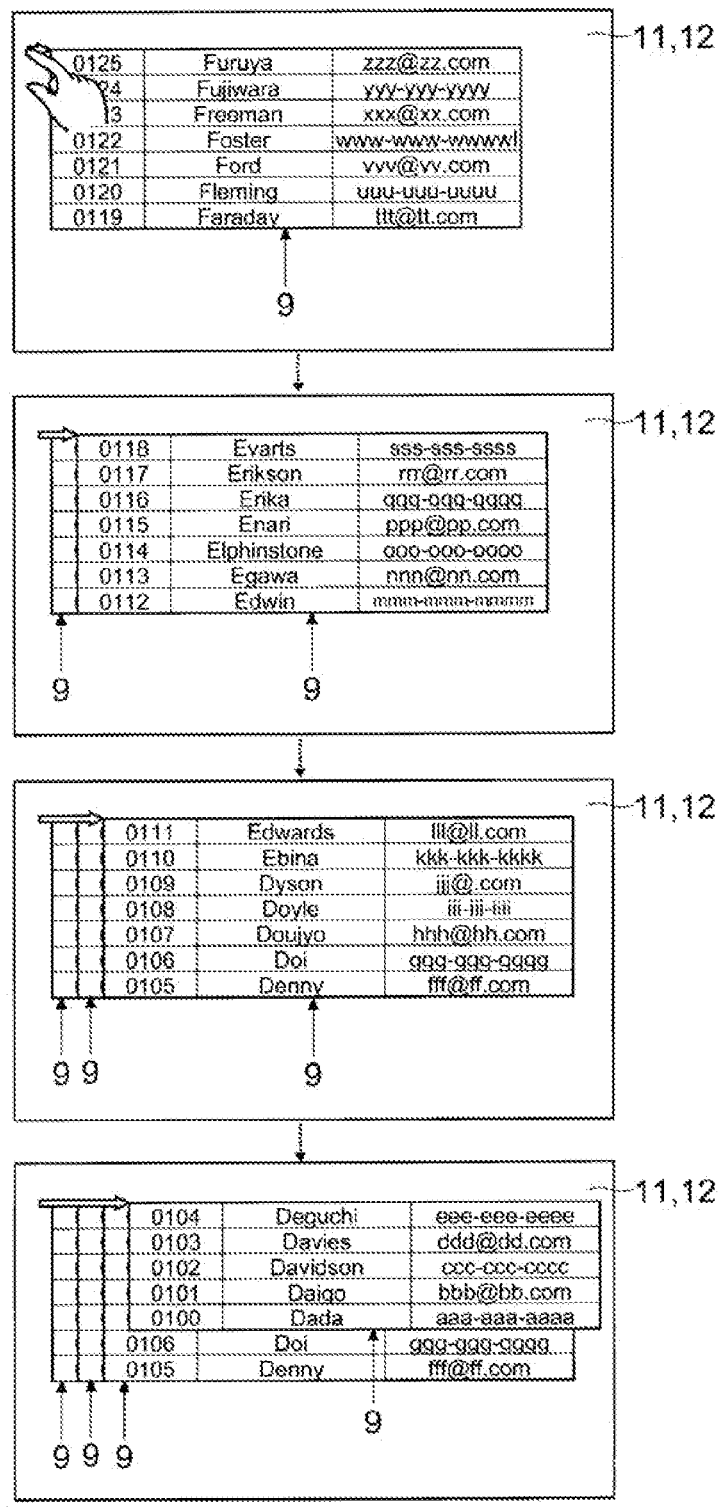
FIG. 15 is an explanatory drawing showing one example in which plural pages of the list is displayed in a direction from left to right according to one embodiment of the present disclosure.

Processing of displaying plural pages of the list 9 will be described next with reference to FIGS. 10-15. FIG. 10 is an explanatory drawing showing one example in which the plural pages of the list 9 is displayed in the direction from top right to bottom left. FIG. 11 is an explanatory drawing showing one example in which the plural pages of the list 9 is displayed in the direction from top left to bottom right. FIG. 12 is an explanatory drawing showing one example in which the plural pages of the list 9 is displayed in the direction from top to bottom. FIG. 13 is an explanatory drawing showing one example in which the plural pages of the list 9 is displayed in the direction from bottom to top. FIG. 14 is an explanatory drawing showing one example in which the plural pages of the list 9 is displayed in the direction from right to left. FIG. 15 is an explanatory drawing showing one example in which the plural pages of the list 9 is displayed in the direction from left to right.

It is noted that the list 9 used for specifying a destination are displayed on a screen for setting a transmission job of image data (e.g., on the destination setting screen 83). However, part thereof other than the list 9 dares not be displayed for the sake of convenience and clear view.

First, as described with reference to FIGS. 8 and 9, the user performs simultaneous plural-point touch to call up the list 9. Upon the simultaneous plural-point touch, the panel control section 10 recognizes, on the basis of the output from the touch panel 12, a distance and a moving direction between the a first touched point and a touched point after move.

Specifically, in the case where one of touched points is moved with the fingers kept in touch with the touch panel 12 after plural-point touch (e.g., two-point touch), the first touched point means a point of the plural touched points, which is a point when the moved touched point is touched first. It is noted that where each of plural touched points is moved, the first touched point means one of first touched points (e.g., one closer to a corner of the display region of the display section 11). Alternatively, the first touched point is a point touched again where fingers once separate from the touch panel 12 without move after plural-point touch (e.g., two-point touch).

In this way, when the user touches, for example, two points and then slides and moves the touched two points with them keep in touch to the touch panel 12, the number of display pages of the list 9 and the like can be manipulated. Alternatively, when the user touches two points, separates the fingers from the touch panel 12, touches one point, and moves and slides the touched one point, the number of display pages of the list 9, the order of display (ascending order or descending order), and the like can be manipulated.

On the basis of the coordinates of the position of the first touched point and those of the position of the touched point after move, which are detected by the touch panel 12, the panel control section 10 calculates to obtain the moving distance and the moving direction between the first touched point and the touched point after move. For example, the panel control section 10 obtains a square root of a sum of a square of difference between the coordinate in the horizontal direction of the position of the first touched point and the coordinate in the horizontal direction of the position of the touched point after move and a square of difference between the coordinate in the vertical direction of the position of the first touched point and the coordinate in the vertical direction of the position of the touched point after move, thereby obtaining the moving distance between the first touched point and the touched point after move. Alternatively, the panel control section 10 obtains a ratio of difference between the coordinate in the vertical direction of the first touched point and the coordinate in the vertical direction of the touched point after move to difference between the coordinate in the horizontal direction of the position of the first touched point and the coordinate in the horizontal direction of the position of the touched point after move, thereby obtaining the moving direction between the first touched point and the touched point after move from the gradient between the first touched point and the touched point after move.

Then, as shown in FIGS. 10-15, the panel control section 10 increases the number of display pages of the list 9 as the moving distance of the touched point becomes long. Specifically, the panel control section 10 increases one display page of the list 9 every time the moving distance exceeds a predetermined interval. In other words, the panel control section 10 allows the display section 11 to display the list 9 of which the number of display pages is equal to an integer obtained by dividing the moving distance by the predetermined interval.

Further, since the list 9 occupy a region of the display section 11 to some extent, the panel control section 10 allows the display section 11 to display a new page of the list 9 so that the new page of the list 9 is overlaid on a currently displayed page of the list 9. Thus, a newly displayed page of the list 9 is always located at the forefront when the user watches.

Then, the panel control section 10 allows new pages of the list 9 to be consecutively displayed over the currently displayed page of the list 9 on the front in the recognized moving direction. In other words, the panel control section 10 allows the display section 11 to display the new pages of the list 9 consecutively in the moving direction of the touched point.

In order to display the new pages of the list 9 consecutively in the moving direction of the touched point, as shown in FIGS. 10-15, the panel control section 10 allows the list 9 to be displayed so that the pages are overlaid on the two-point touch. It is noted that the moving direction between the touched points is indicated by white arrows in FIGS. 10-15. In addition, FIGS. 10-15 show that the moving distance becomes long as it goes from the upper diagram to the lower diagram and that the length of each white arrow indicates the length of the moving distance.

When a page of the list 9, which includes the desired destination, is displayed, the user stops moving the touched point. Then, the user's touch in an area where the desired destination is displayed can specify the destination. At this time, the user may once separate his/her finger from the touch panel 12 before touch to the destination in the list 9.

The touch panel 12 detects an event that an area where the list 9 is displayed is touched and receives specification of the destination. Next, the panel control section 10 recognizes the specified destination on the basis of the output from the touch panel 12. When execution of a transmission job is instructed, the panel control section 10 or the core control section 6 allows the communication section 63 to transmit the image data to the specified destination.

Here, whether the pages of the list 9 are displayed in the ascending order of the destination names or the descending order of the destination name is determined in advance according to the moving direction of the touched point. In the examples of the present embodiment, as shown in FIGS. 10-15, when the moving direction is a direction from right to left, top to bottom, top right to bottom left, or bottom right to top left, the panel control section 10 allows the display section 11 to display the list 9 in which the destination names are arranged in the ascending order (to display data with a smaller value; in the alphabetical order in the examples in FIGS. 10-15). By contrast, when the moving direction is a direction from left to right, bottom to top, top left to bottom right, or bottom left to top right, the panel control section 10 allows the display section 11 to display the list 9 in which the destination names are arranged in the descending order (to display data with a larger value; in the reverse order of the alphabetical order in the examples in FIGS. 10-15). Accordingly, as the moving distance of the touched point becomes long, the panel control section 10 allows the display section 11 to consecutively display the pages of the list 9 in which the destination names are arranged in the ascending order or the descending order. It is noted that display in the ascending order or the descending order relative to the moving direction is not limited to the above examples and can be set arbitrarily.

Next, examples of display appearance of the list 9 will be described with reference to FIGS. 10-15. It is noted that FIGS. 10-15 show examples of the list 9 in the state where refinement is performed through a first refinement key 86 so as to display only address information of destination names bearing D, E, or F as the initial characters.

FIG. 10 shows one example of display appearance of the list 9 where the touched point is moved in the direction from top right to bottom left. In the example shown in FIG. 10, as depicted in the uppermost diagram, the first touched point is located in an upper right area of the display region of the display section 11. As indicated by the white arrow in FIG. 10, the moving direction of the touched point is the direction from top right to bottom left.

As shown in the uppermost diagram of FIG. 10, when the moving distance exceeds the predetermined interval, the panel control section 10 allows the display section 11 to display the first page of the list 9, in which the destination names are arranged in the ascending order, according to the moving direction. At this time, in order to easily display the second and following pages of the list 9, the panel control section 10 allows the first page of the list 9 in a display area based on a predetermined rule according to the position of the first touched point. For example, as shown in FIG. 10, where the display region of the display section 11 is divided equally (e.g., divided into four areas), the panel control section 10 may allow the display section 11 to display the first page of the list 9 so that the upper right corner of the first page of the list 9 is overlaid on the touched point when the first touched point is located in the upper right area of the divided areas.

Thereafter, as depicted in the second to the lowermost diagrams of FIG. 10, every time the moving distance exceeds the predetermined interval, the panel control section 10 allows a new page of the list 9 to be displayed in turn so that the new page is overlaid on part of the currently displayed page of the list 9 in the moving direction of the touched point. Further, the panel control section 10 allows the display section 11 to display a new page of the list 9 so that the upper right corner of the newly displayed page of the list 9 is overlaid on the touched point (when the moving distance becomes an integral multiple of the predetermined interval). It is noted that in order to return to the previously displayed page of the list 9 (in order to display the overlaid and hidden page of the list 9), the touched point is returned so that the moving distance becomes short (moves the touched point in the upper right direction). The panel control section 10 increases the number of pages of the list 9 to be displayed on the display section 11 as the moving distance increases, and decreases the number of pages of the list 9 to be displayed on the display section 11 as the moving distance decreases.

The example shown in FIG. 11 will be described next. FIG. 11 shows one example of display appearance of the list 9 where the touched point is moved in the direction from top left to bottom right. In the example shown in FIG. 11, as depicted in the uppermost diagram, the first touched point is located in an upper left area of the display region of the display section 11. As indicated by the white arrow in FIG. 11, the moving direction of the touched point is the direction from top left to bottom right.

As shown in the uppermost diagram of FIG. 11, when the moving distance exceeds the predetermined interval, the panel control section 10 allows the display section 11 to display the first page of the list 9, in which the destination names are arranged in the descending order, according to the moving direction. At this time, in order to easily display the second and following pages of the list 9, the panel control section 10 allows the first page of the list 9 in a display area based on a predetermined rule according to the position of the first touched point. For example, as shown in FIG. 11, where the display region of the display section 11 is divided equally (e.g., divided into four), the panel control section 10 may allow the display section 11 to display the first page of the list 9 so that the upper left corner of the first page of the list 9 is overlaid on the touched point when the first touched point is located in the upper left area of the divided areas.

Thereafter, as depicted in the second to the lowermost diagrams of FIG. 11, every time the moving distance exceeds the predetermined interval, the panel control section 10 allows a new page of the list 9 to be displayed in turn so that the new page is overlaid on part of the currently displayed page of the list 9 in the moving direction of the touched point. Further, the panel control section 10 allows the display section 11 to display a new page of the list 9 so that the upper left corner of the newly displayed page of the list 9 is overlaid on the touched point (when the moving distance becomes an integral multiple of the predetermined interval). It is noted that in order to return to the previously displayed page of the list 9 (in order to display the overlaid and hidden page of the list 9), the touched point is returned so that the moving distance becomes short (moves the touched point in the upper left direction). The panel control section 10 increases the number of pages of the list 9 to be displayed on the display section 11 as the moving distance increases, and decreases the number of pages of the list 9 to be displayed on the display section 11 as the moving distance decreases.

The example shown in FIG. 12 will be described next. FIG. 12 shows one example of display appearance of the list 9 where the touched point is moved in the direction from top to bottom. In the example shown in FIG. 12, as depicted in the uppermost diagram, the first touched point is located in an upper right area of the display region of the display section 11. As indicated by the white arrow in FIG. 12, the moving direction of the touched point is the direction from top to bottom.

As shown in the uppermost diagram of FIG. 12, when the moving distance exceeds the predetermined interval, the panel control section 10 allows the display section 11 to display the first page of the list 9, in which the destination names are arranged in the ascending order, according to the moving direction. At this time, in order to easily display the second and following pages of the list 9, the panel control section 10 allows the first page of the list 9 in a display area based on a predetermined rule according to the position of the first touched point. For example, as shown in FIG. 12, where the display region of the display section 11 is divided equally (e.g., divided into four areas), the panel control section 10 may allow the display section 11 to display the first page of the list 9 so that the upper right corner of the first page of the list 9 is overlaid on the touched point when the first touched point is located in the upper right area of the divided areas.

Thereafter, as depicted in the second to the lowermost diagrams of FIG. 12, every time the moving distance exceeds the predetermined interval, the panel control section 10 allows a new page of the list 9 to be displayed in turn so that the new page is overlaid on part of the currently displayed page of the list 9 in the moving direction of the touched point. Further, the panel control section 10 allows the display section 11 to display a new page of the list 9 so that the upper right corner of the newly displayed page of the list 9 is overlaid on the touched point (when the moving distance becomes an integral multiple of the predetermined interval). It is noted that in order to return to the previously displayed page of the list 9 (in order to display the overlaid and hidden page of the list 9), the touched point is returned so that the moving distance becomes short (moves the touched point upward). The panel control section 10 increases the number of pages of the list 9 to be displayed on the display section 11 as the moving distance increases, and decreases the number of pages of the list 9 to be displayed on the display section 11 as the moving distance decreases.

The example shown in FIG. 13 will be described next. FIG. 13 shows one example of display appearance of the list 9 where the touched point is moved in the direction from bottom to top. In the example shown in FIG. 13, as depicted in the uppermost diagram, the first touched point is located in a lower left area of the display region of the display section 11. As indicated by the white arrow in FIG. 13, the moving direction of the touched point is the direction from bottom to top.

As shown in the uppermost diagram of FIG. 13, when the moving distance exceeds the predetermined interval, the panel control section 10 allows the display section 11 to display the first page of the list 9, in which the destination names are arranged in the descending order, according to the moving direction. At this time, in order to easily display the second and following pages of the list 9, the panel control section 10 allows the first page of the list 9 in a display area based on a predetermined rule according to the position of the first touched point. For example, as shown in FIG. 13, where the display region of the display section 11 is divided equally (e.g., divided into four areas), the panel control section 10 may allow the display section 11 to display the first page of the list 9 so that the lower left corner of the first page of the list 9 is overlaid on the touched point when the first touched point is located in the lower left area of the divided areas.

Thereafter, as depicted in the second to the lowermost diagrams of FIG. 13, every time the moving distance exceeds the predetermined interval, the panel control section 10 allows a new page of the list 9 to be displayed in turn so that the new page is overlaid on part of the currently displayed page of the list 9 in the moving direction of the touched point.

Further, the panel control section 10 allows the display section 11 to display a new page of the list 9 so that the lower left corner of the newly displayed page of the list 9 is overlaid on the touched point (when the moving distance becomes an integral multiple of the predetermined interval). It is noted that in order to return to the previously displayed page of the list 9 (in order to display the overlaid and hidden page of the list 9), the touched point is returned so that the moving distance becomes short (moves the touched point downward). The panel control section 10 increases the number of pages of the list 9 to be displayed on the display section 11 as the moving distance increases, and decreases the number of pages of the list 9 to be displayed on the display section 11 as the moving distance decreases.

The example shown in FIG. 14 will be described next. FIG. 14 shows one example of display appearance of the list 9 where the touched point is moved in the direction from right to left. In the example shown in FIG. 14, as depicted in the uppermost diagram, the first touched point is located in a lower right area of the display region of the display section 11. As indicated by the white arrow in FIG. 14, the moving direction of the touched point is the direction from right to left.

As shown in the uppermost diagram of FIG. 14, when the moving distance exceeds the predetermined interval, the panel control section 10 allows the display section 11 to display the first page of the list 9, in which the destination names are arranged in the ascending order, according to the moving direction. At this time, in order to easily display the second and following pages of the list 9, the panel control section 10 allows the first page of the list 9 in a display area based on a predetermined rule according to the position of the first touched point. For example, as shown in FIG. 14, where the display region of the display section 11 is divided equally (e.g., divided into four areas), the panel control section 10 may allow the display section 11 to display the first page of the list 9 so that the lower right corner of the first page of the list 9 is overlaid on the touched point when the first touched point is located in the lower right area of the divided areas.

Thereafter, as depicted in the second to the lowermost diagrams of FIG. 14, every time the moving distance exceeds the predetermined interval, the panel control section 10 allows a new page of the list 9 to be displayed in turn so that the new page is overlaid on part of the currently displayed page of the list 9 in the moving direction of the touched point. Further, the panel control section 10 allows the display section 11 to display a new page of the list 9 so that the lower right corner of the newly displayed page of the list 9 is overlaid on the touched point (when the moving distance becomes an integral multiple of the predetermined interval). It is noted that in order to return to the previously displayed page of the list 9 (in order to display the overlaid and hidden page of the list 9), the touched point is returned so that the moving distance becomes short (moves the touched point rightward). The panel control section 10 increases the number of pages of the list 9 to be displayed on the display section 11 as the moving distance increases, and decreases the number of pages of the list 9 to be displayed on the display section 11 as the moving distance decreases.

The example shown in FIG. 15 will be described next. FIG. 15 shows one example of display appearance of the list 9 where the touched point is moved in the direction from left to right. In the example shown in FIG. 15, as depicted in the uppermost diagram, the first touched point is located in an upper left area of the display region of the display section 11. As indicated by the white arrow in FIG. 15, the moving direction of the touched point is the direction from left to right.

As shown in the uppermost diagram of FIG. 15, when the moving distance exceeds the predetermined interval, the panel control section 10 allows the display section 11 to display the first page of the list 9, in which the destination names are arranged in the descending order, according to the moving direction. At this time, in order to easily display the second and following pages of the list 9, the panel control section 10 allows the first page of the list 9 in a display area based on a predetermined rule according to the position of the first touched point. For example, as shown in FIG. 15, where the display region of the display section 11 is divided equally (e.g., divided into four areas), the panel control section 10 may allow the display section 11 to display the first page of the list 9 so that the upper left corner of the first page of the list 9 is overlaid on the touched point when the first touched point is located in the upper left area of the divided areas.

Thereafter, as depicted in the second to the lowermost diagrams of FIG. 15, every time the moving distance exceeds the predetermined interval, the panel control section 10 allows a new page of the list 9 to be displayed in turn so that the new page is overlaid on part of the currently displayed page of the list 9 in the moving direction of the touched point. Further, the panel control section 10 allows the display section 11 to display a new page of the list 9 so that the upper left corner of the newly displayed page of the list 9 is overlaid on the touched point (when the moving distance becomes an integral multiple of the predetermined interval). It is noted that in order to return to the previously displayed page of the list 9 (in order to display the overlaid and hidden page of the list 9), the touched point is returned so that the moving distance becomes short (moves the touched point leftward). The panel control section 10 increases the number of pages of the list 9 to be displayed on the display section 11 as the moving distance increases, and decreases the number of pages of the list 9 to be displayed on the display section 11 as the moving distance decreases.

(Flow of Display Control on List 9)

Figure 16:
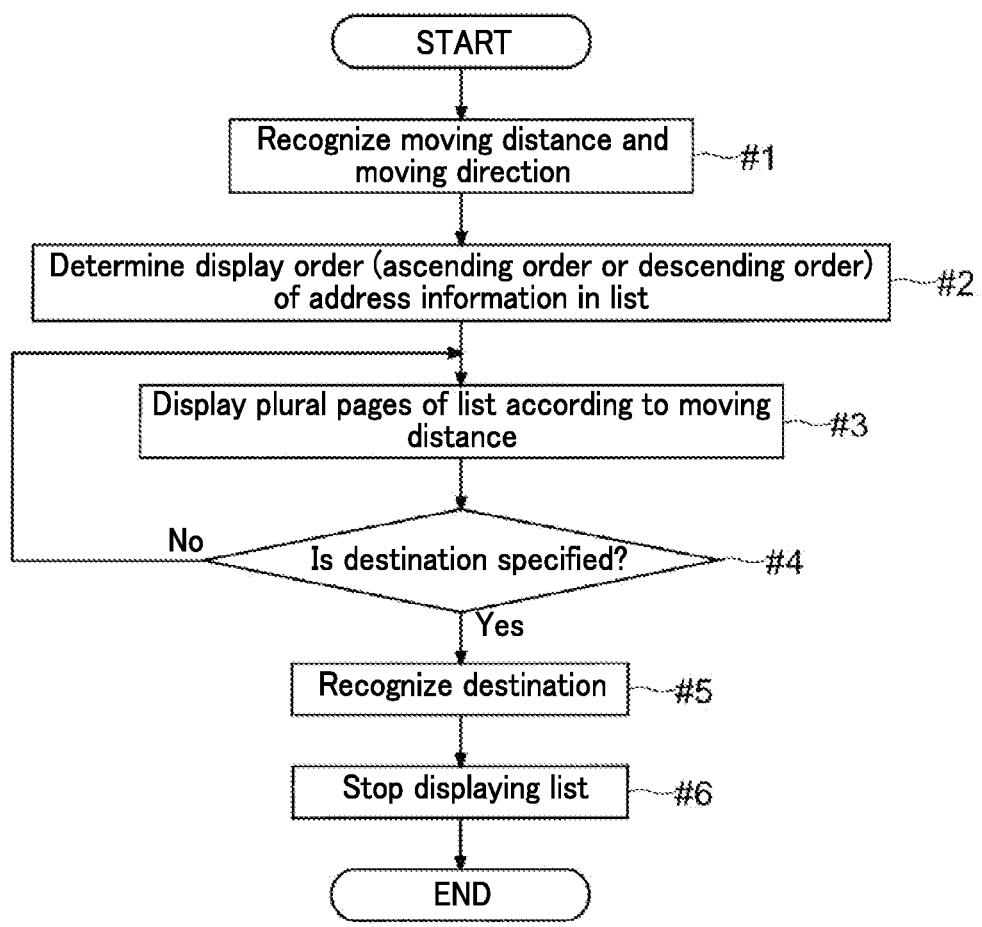
FIG. 16 is a flowchart depicting one example of a flow of display control on the list according to one embodiment of the present disclosure.

One example of a flow of display control on the list 9 on the operation panel 1 according to the present embodiment will be described next with reference to FIG. 16. FIG. 16 is a flowchart depicting one example of a flow of display control on the list 9.

First, the flow in FIG. 16 starts when the touch panel 12 detects the operation (simultaneous plural-point touch) to call up for the list 9, which is input through the destination setting screen 83 or the like by the user, and the panel control section 10 recognizes that the list 9 will be displayed from now. At this time, the destination data 7 is refined into a predetermined number of pieces of address information displayed in the list 9 through a first refinement key 86 or a second refinement key 87.

Subsequently, the panel control section 10 recognizes, on the basis of the output from the touch panel 12, the moving distance and the moving direction between the first touched point and the touched point after move (Step #1). Then, the panel control section 10 determines, according to the moving direction, whether the destination names in the list 9 are displayed in the ascending order or the descending order (Step #2). In other words, the panel control section 10 determines the display order of the address information in the list 9 (Step #2).

Then, the panel control section 10 allows the display section 11 to display the list 9, of which the number of pages accords with the moving distance from the first touched point to the touched point after move (Step #3). In order to display plural pages of the list 9, the display section 11 displays a new page of the list 9 so that the new page of the list 9 is overlaid on the currently displayed page of the list 9.

Next, when an area where a destination in the list 9 is displayed is touched, the panel control section 10 determines, on the basis of the output from the touch panel 12, whether the destination is specified (Step #4). When the destination is not specified (No in Step #4), the flow returns to Step #3. By contrast, when the destination is specified (Yes in Step #4), the panel control section 10 recognizes the destination (Step #5). Next, the panel control section 10 stops the display section 11 from displaying the list 9 (terminates display of the list 9; Step #6). Then, the flow terminates (END).

The display/input device according to the present embodiment includes a storage section configured to store destination data indicating plural pieces of address information including a plurality of destination names and plural pieces of destination information corresponding to the plurality of destination name; a display section configured to display a screen; a touch panel configured to detect user's touched point; a control section configured to allow the display section to display a list for specifying a destination name of the plurality of destination names on the basis of the destination data; and a recognition section configured to recognize a moving direction in which the touched point moves. When the recognition section recognizes the moving direction of the touched point, the control section allows the display section to display the list in plural pages in the moving direction.

Accordingly, the plural pages of the list can be displayed on the display section easily. This enables the user to easily and quickly specify a desired destination.

For example, the display/input device (the operation panel 1) according to the present embodiment includes; the storage section (the memory 15 or the storage device 62) configured to store, as the destination data 7, address information including a plurality of destination names and plural pieces of destination information indicating numbers and addresses of destination corresponding to the destination names; the display section 11 configured to display a screen; the touch panel 12 provided in the display section 11 and configured to receive user's input and to detect one or plural touched points; the control section (the panel control section 10) configured to allow the display section 11 to display the list 9 that indicates plural pieces of address information for specifying a destination name of the plurality of destination names on the basis of the destination data 7; and the recognition section (the panel control section 10) configured to recognize a moving distance from a first touched point to a touched point after move and a moving direction in which the touched point moves. When the touch panel 12 receives simultaneous plural-point touch, the control section (the panel control section 10) allows the display section 11 to display one or plural pages of the list 9. The recognition section (panel control section 10) increases the number of pages of the list 9 to be displayed on the display section 11 as the moving distance increases. In order for the display section 11 to display plural pages of the list 9, the display section 11 displays a new page of the list 9 so that the new page of the list 9 is overlaid on the currently displayed page of the list 9 in turn in the moving direction that the recognition section (the panel control section 10) recognizes. The touch panel 12 receives input for specification of any of the destinations included in the list 9.

It is noted that the first touched point means any one of touched points which is moved with fingers kept in touch with the touch panel 12 after plural-point touch (e.g., two-point touch). Alternatively, the first touched point is a point touched again where fingers once separate from the touch panel 12 without move after plural-point touch (e.g., two-point touch).

With the above configuration, when the touch panel receives simultaneous plural-point touch, the display section displays one or plural pages of the list 9. As the moving distance that the recognition section recognizes becomes long, the number of displayed pages of the list 9 is increased. In displaying plural pages of the list 9, a new page of the list 9 is displayed and overlaid on the currently displayed page of the list 9 consecutively in the moving direction that the recognition section (the panel control section 10) recognizes. The touch panel 12 receives input for specification of any of the destinations included in the list 9. Thus, the user's simultaneous plural-point touch can result in display of the list 9. Accordingly, the user's simultaneous plural-point touch can result in display of the list 9. Further, the user's adjustment of the travel amount of the touched point can result in control of the number of displayed pages of the list 9. Moreover, since the list 9 is developed consecutively in the direction in which the touched point is moved, the operation of sliding the touched point is directly connected to an operation to manipulate the display of the list 9. This enables smooth setting of the number of displayed pages of the list 9 and the direction. Thus, the user can perform an intuitive operation to easily allow the display section 11 to display a desired destination. In addition, the user can easily and quickly specify a desired destination.

Moreover, it is determined in advance according to the moving direction whether pages of the list, in which the address information is arranged in the ascending order of the destination names, are displayed consecutively, or pages of the list, in which the address information is arranged in the descending order of the destination names, are displayed consecutively. The control section allows pages of the list, in which the address information is arranged in the ascending order or the descending order of the destination names, to be displayed according to the moving direction.

Still more, it is determined in advance according to the moving direction whether pages of the list 9, in which the address information is arranged in the ascending order of the destination names, are displayed consecutively, or pages of the list 9, in which the address information is arranged in the descending order of the destination names, is displayed consecutively. The control section (the panel control section 10) allows the display section 11 to display pages of the list 9, in which the address information is arranged in the ascending order or the descending order of the destination names, according to the moving direction. With this configuration, it is determined in advance according to the moving direction whether pages of the list 9, in which the address information is arranged in the ascending order of the destination names, is displayed consecutively, or pages of the list 9, in which the address information is arranged in the descending order of the destination names, is displayed consecutively. The control section (the panel control section 10) allows pages of the list 9, in which the address information is arranged in the ascending order or the descending order of the destination names, to be displayed according to the moving direction. Accordingly, the user can determine whether the contents (the destination names to be displayed) of the list 9 are arranged in the ascending order or the descending order according to the direction in which the touched points is moved. Thus, the contents of the list 9 can be displayed in the order that the user desires.

In addition, the control section (the panel control section 10) allows the display section 11 to display the list 9 so that the list 9 is overlaid on the touched point. With this configuration, the control section (the panel control section 10)

allows the list to be displayed so that the list is overlaid on the touched point. Thus, pages of the list 9 can be displayed in the moving direction in which the touched point moves.

Furthermore, the recognition section (the panel control section 10) recognizes the moving distance and the moving direction to a newly touched point after simultaneously plural-point touch is lost or the moving distance and the moving direction of any of the touched points kept in touch after simultaneous plural-point touch. With this configuration, the recognition section (the panel control section 10) recognizes the moving distance and the moving direction to a newly touched point after simultaneously plural-pointed touch is lost or the moving distance and the moving direction of any of the touched points kept in touch after simultaneous plural-point touch. Accordingly, after plural-point touch to the touch panel 12 (after a mode for displaying the list 9 is set), for example, an operation of moving a finger touched to one point or an operation of moving any of fingers used for plural-point touch to display the list 9 can control display of the list 9 in plural pages.

Still more, when the touch panel 12 receives input for specification of the range of the address information displayed in the list 9, the control section (the panel control section 10) allows the display section 11 to display the list 9 in which the address information in the specified range are arranged in the ascending order or the descending order of the destination names. With this configuration, when the touch panel 12 receives input for specification of the range of the address information displayed in the list 9, the control section (the panel control section 10) allows the display section 11 to display the list 9 in which the address information in the specified range are arranged in the ascending order or the descending order of the destination names. Accordingly, the list 9 can be displayed after refinement of targets to be displayed in the list 9. This can reduces the number of displayed pages of the list 9, thereby enabling quick display of the list 9 including a desired destination name.

The image forming apparatus (e.g., the multifunction peripheral 100) includes the display/input device (the operation panel 1) according to the above embodiment. Thus, the user can perform an intuitive operation to easily allow the display section 11 to display a desired destination, thereby enabling easy and intuitive specification of the desired destination. With this configuration, which includes the above described display/input device, the user can perform an intuitive operation to easily allow the display section to display the desired destination, thereby enabling easy and intuitive specification of a desired destination. Thus, a user-friendly image forming apparatus can be provided which can be easily operated for transmission.

According to the display/input device and the image forming apparatus of the present disclosure, an intuitive operation beginning with plural-point touch can result in easy display of a desired destination on the operation panel, thereby enabling easy and quick specification of the desired destination.

The embodiments of the present disclosure have been described above. However, the present disclosure is not limited to the above embodiments, and various modifications can be made within the scope of not deviated from the subject matter of the disclosure.

What is claimed is:

1. A display/input device, comprising:
a storage section configured to store destination data indicating plural pieces of address information including a plurality of destination names and plural pieces of destination information corresponding to the plurality of destination names;
a display section configured to display a screen;
a touch panel configured to detect user's touched point;
a control section configured to allow the display section to display any page of plural pages included in a list for specifying a destination name of the plurality of destination names on the basis of the destination data; and
a recognition section configured to recognize a moving direction in which the touched point moves,
wherein when the recognition section recognizes the moving direction of the touched point, the control section allows the display section to display the plural pages in the list consecutively in the moving direction in a manner to change the number of displayed plural pages.

2. The display/input device of claim 1, wherein
the recognition section recognizes a moving distance of the touched point, and
the control section allows the display section to display the list in plural pages of which the number accords with a length of the moving distance that the recognition section recognizes.

3. The display/input device of claim 2, wherein
the control section increases the number of pages of the list to be displayed on the display section as the moving distance increases, and decreases the number of pages of the list to be displayed on the display section as the moving distance decreases.

4. The display/input device of claim 1, wherein
the control section allows a new page of the list to be overlaid and displayed on a currently displayed page of the list.

5. The display/input device of claim 1, wherein
when the recognition section recognizes that the touched point is slid and moved, the control section changes the number of pages of the list to be displayed on the display section.

6. The display/input device of claim 1, wherein
when the recognition section recognizes that after simultaneous plural-point touch is lost, a newly touched point is slid and moved, the control section changes the number of pages of the list to be displayed on the display section.

7. The display/input device of claim 1, wherein
it is determined in advance according to the moving direction whether pages of the list, in which the address information is arranged in the ascending order of the destination names, are displayed consecutively, or pages of the list, in which the address information is arranged in the descending order of the destination names, are displayed consecutively, and
the control section allows the display section to display the pages of the list, in which address information is arrange in the ascending order or the descending order of the destination names, according to the moving direction.

8. The display/input device of claim 1, wherein
the control section allows the display section to display the list so that the list is overlaid on the touched point.

9. The display/input device of claim 2, wherein
the recognition section recognizes a moving distance and a moving direction to a newly touched point after simultaneously plural-point touch is lost or a moving distance and a moving direction of any of touched points kept in touch after simultaneous plural-point touch.

10. The display/input device of claim 1, wherein
the control section
narrows a range of the plural pieces of address information based on initial characters of the destination names or types of transmission methods, and allows the display section to display a list in which address information in the narrowed range is arranged in an ascending order or a descending order of the destination names.

11. The display/input device of claim 1, wherein the address information further includes attribution information.

12. The display/input device of claim 1, wherein the destination information includes a facsimile terminal address, a network facsimile address, an email address, a Server Message Block folder address, or a File Transfer Protocol folder.

13. An image forming apparatus, comprising:
the display/input device of claim 1; and
an image reading device configured to read an original document to obtain image data of the original document.

* * * * *